(12) United States Patent
Park et al.

(10) Patent No.: US 11,803,296 B2
(45) Date of Patent: Oct. 31, 2023

(54) ELECTRONIC DEVICE DISPLAYING INTERFACE FOR EDITING VIDEO DATA AND METHOD FOR CONTROLLING SAME

(71) Applicant: Samsung Electronics Co., Ltd., Suwon-si (KR)

(72) Inventors: Sunyoung Park, Suwon-si (KR); Chunhyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/520,208

(22) Filed: Nov. 5, 2021

(65) Prior Publication Data

US 2022/0057929 A1 Feb. 24, 2022

Related U.S. Application Data

(63) Continuation of application No. 16/282,902, filed on Feb. 22, 2019, now Pat. No. 11,169,680.

(30) Foreign Application Priority Data

Feb. 23, 2018 (KR) ........................ 10-2018-0022000

(51) Int. Cl.
  *G06F 3/04847* (2022.01)
  *G06F 3/04886* (2022.01)
  (Continued)

(52) U.S. Cl.
  CPC ...... *G06F 3/04847* (2013.01); *G06F 3/04886* (2013.01); *G11B 27/005* (2013.01); *G11B 27/031* (2013.01); *G11B 27/34* (2013.01)

(58) Field of Classification Search
  CPC ..... G11B 27/005; G11B 27/031; G11B 27/34; G06F 3/04847; G06F 3/04886
  See application file for complete search history.

(56) References Cited

U.S. PATENT DOCUMENTS

| 8,842,727 B2 | 9/2014 | Washino |
| 10,192,583 B2 | 1/2019 | Chee et al. |

(Continued)

FOREIGN PATENT DOCUMENTS

| EP | 2 610 760 A2 | 7/2013 |
| EP | 3 125 528 A2 | 2/2017 |

(Continued)

OTHER PUBLICATIONS

European Search Report dated Jul. 23, 2019, issue in European Patent Application No. 19158956.3.

(Continued)

*Primary Examiner* — Tadesse Hailu
(74) *Attorney, Agent, or Firm* — Jefferson IP Law, LLP

(57) ABSTRACT

An electronic device is provided. The electronic device includes at least one processor configured to obtain at least one first video data based on a first frame rate and at least one second video data based on a second frame rate that is higher than the first frame rate, when a request for playing video data is received, control the touchscreen to display a playing screen for the video data on a region, when a request for an editing interface is received while the playing screen is displayed, control the touchscreen to display a progress bar to indicate a full video section, the progress bar including at least one first video section corresponding to the at least one first video data and at least one second video section corresponding to the at least one second video data, and control the touchscreen to display at least some of at least one representative image.

12 Claims, 31 Drawing Sheets

(51) Int. Cl.
  *G11B 27/00* (2006.01)
  *G11B 27/031* (2006.01)
  *G11B 27/34* (2006.01)

(56) References Cited

U.S. PATENT DOCUMENTS

| | | | |
|---|---|---|---|
| 10,715,761 B2 | 7/2020 | Lee et al. | |
| 10,764,530 B2 | 9/2020 | Khandelwal et al. | |
| 2008/0186392 A1 | 8/2008 | Matsuyama | |
| 2009/0300676 A1 | 12/2009 | Harter, Jr. | |
| 2010/0226622 A1* | 9/2010 | Morikawa | H04N 5/783 386/248 |
| 2011/0097059 A1 | 4/2011 | Sekiguchi et al. | |
| 2011/0275416 A1 | 11/2011 | Chang et al. | |
| 2011/0293244 A1 | 12/2011 | Kuriyama | |
| 2012/0189287 A1* | 7/2012 | Otani | H04N 5/783 386/E5.052 |
| 2012/0210228 A1* | 8/2012 | Wang | G11B 27/007 715/723 |
| 2012/0210232 A1* | 8/2012 | Wang | H04N 19/117 715/723 |
| 2013/0071095 A1 | 3/2013 | Chauvier et al. | |
| 2013/0188923 A1 | 7/2013 | Hartley et al. | |
| 2014/0099074 A1* | 4/2014 | Kano | H04N 9/7921 386/241 |
| 2014/0169765 A1* | 6/2014 | Wang | G11B 27/031 386/280 |
| 2014/0186006 A1 | 7/2014 | Jin | |
| 2014/0193140 A1 | 7/2014 | Fliderman et al. | |
| 2014/0336796 A1* | 11/2014 | Agnew | G09B 5/00 700/91 |
| 2015/0067811 A1 | 3/2015 | Agnew et al. | |
| 2015/0078734 A1 | 3/2015 | Yoo et al. | |
| 2015/0187386 A1* | 7/2015 | Hayashi | H04N 5/783 386/230 |
| 2016/0100129 A1 | 4/2016 | Im | |
| 2016/0104508 A1* | 4/2016 | Chee | H04N 21/2668 386/227 |
| 2016/0125234 A1* | 5/2016 | Ota | G06T 7/20 382/103 |
| 2016/0217552 A1 | 7/2016 | Yang et al. | |
| 2016/0269674 A1 | 9/2016 | Rathore et al. | |
| 2017/0034444 A1* | 2/2017 | Song | G11B 27/036 |
| 2017/0072321 A1* | 3/2017 | Thompson | A63F 13/61 |
| 2017/0094191 A1 | 3/2017 | Hashizume | |
| 2017/0134605 A1 | 5/2017 | Ju et al. | |
| 2017/0302719 A1 | 10/2017 | Chen et al. | |
| 2018/0035075 A1 | 2/2018 | Lee et al. | |
| 2018/0035137 A1 | 2/2018 | Chen et al. | |
| 2018/0091728 A1 | 3/2018 | Brown et al. | |
| 2018/0115788 A1* | 4/2018 | Burns | G06V 20/41 |
| 2018/0338167 A1 | 11/2018 | Chi et al. | |

FOREIGN PATENT DOCUMENTS

| | | |
|---|---|---|
| EP | 3 276 950 A1 | 1/2018 |
| JP | 2007-166501 A | 6/2007 |
| JP | 2010-212875 A | 9/2010 |
| KR | 10-2017-0013083 A | 2/2017 |
| KR | 10-2017-0054924 A | 5/2017 |
| KR | 10-2018-0013325 A | 2/2018 |

OTHER PUBLICATIONS

Korean Office Action with English translation dated Dec. 19, 2022; Korean Appln. No. 10-2018-0022000.
European Summons to Attend Oral Proceedings dated Jun. 19, 2023; European Appln. No. 19 158 956.3-1208.

* cited by examiner

ELECTRONIC DEVICE DISPLAYING INTERFACE FOR EDITING VIDEO DATA AND METHOD FOR CONTROLLING SAME

CROSS-REFERENCE TO RELATED APPLICATION(S)

This application is a continuation application of prior application Ser. No. 16/282,902, filed on Feb. 22, 2019, which has issued as U.S. Pat. No. 11,169,680 on Nov. 9, 2021, and which was based on and claimed priority under 35 U.S.C. § 119(a) of a Korean patent application number 10-2018-0022000, filed on Feb. 23, 2018, in the Korean Intellectual Property Office, the disclosure of each of which is incorporated by reference herein in its entirety.

BACKGROUND

1. Field

The disclosure relates to electronic devices to display a video data control interface and methods for operating the same. More particularly, the disclosure relates to electronic devices to display an interface for setting a playing speed or editing part of video data and methods for operating the same.

2. Description of Related Art

An electronic device may record and produce a video of an object. An electronic device may record a slow motion video of an external object that is moving dynamically or transforming at a high frame rate. The slow motion video may include a video section recorded at a high frame rate. An electronic device may play a video section, which has been recorded at a higher frame rate, at a relatively lower frame rate, allowing the user to easily catch the moving or transforming of the object.

Various electronic devices and methods for operating the same are required to edit a video section of a slow motion video recorded at high frame rate. There is no technology that provides a simplified interface to edit the video section of slow motion video recorded at high frame rate. However, there is increased demand for electronic devices and methods for operating the same to provide a simplified interface for editing the video section of slow motion video recorded at high frame rate.

For example, when the electronic device plays a slow motion video, the electronic device may set the playing speed of at least part of a slow motion video recorded to be lower than the playing speed of another part thereof. To edit at least part of the slow motion video played at lower speed, the user is required to control the electronic device in various manners. For example, the user may be required to determine the start and end time point of playing of video played at slow playing speed and start the function of editing the video between the start and end time point. Various methods for controlling the electronic device as described above may be very time-consuming and cannot allow the user to easily and conveniently edit slow motion video.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device, and a method for operating the electronic device, for displaying a video data control interface to address the above issues.

In accordance with an aspect of the disclosure, an electronic device is provided. The electronic device includes a touchscreen, at least one memory, and at least one processor configured to obtain at least one first video data based on a first frame rate and at least one second video data based on a second frame rate that is higher than the first frame rate, when a request for playing video data is received, control the touchscreen to display a playing screen for the video data on a region, when a request for an editing interface is received while the playing screen is displayed, control the touchscreen to display a progress bar to indicate a full video section, the progress bar including a first video section corresponding to the at least one first video data and a second video section corresponding to the at least one second video data, and control the touchscreen to display at least one representative image corresponding to the at least one second video data.

Additional aspects will be set forth in part in the description which follows and, in part, will be apparent from the description, or may be learned by practice of the presented embodiments.

In accordance with another aspect of the disclosure, a method for operating an electronic device is provided. The method includes obtaining at least one first video data at a first frame rate and at least one second video data at a second frame rate higher than the first frame rate, in response to receiving a request for a playing video data, displaying the playing screen for the video data on a region of a touchscreen, and, in response to receiving a request for a progress bar while displaying the playing screen of the video data, displaying, on the touchscreen, the progress bar to indicate a full video section including a first video section corresponding to the at least one first video data and a second video section corresponding to the at least one second video data, and displaying at least one representative image corresponding to the at least one second video data.

Embodiments of the disclosure are not limited to the foregoing objectives, and other objectives would readily be appreciated by a skilled artisan from the following detailed description taken in conjunction with the accompanying drawings.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
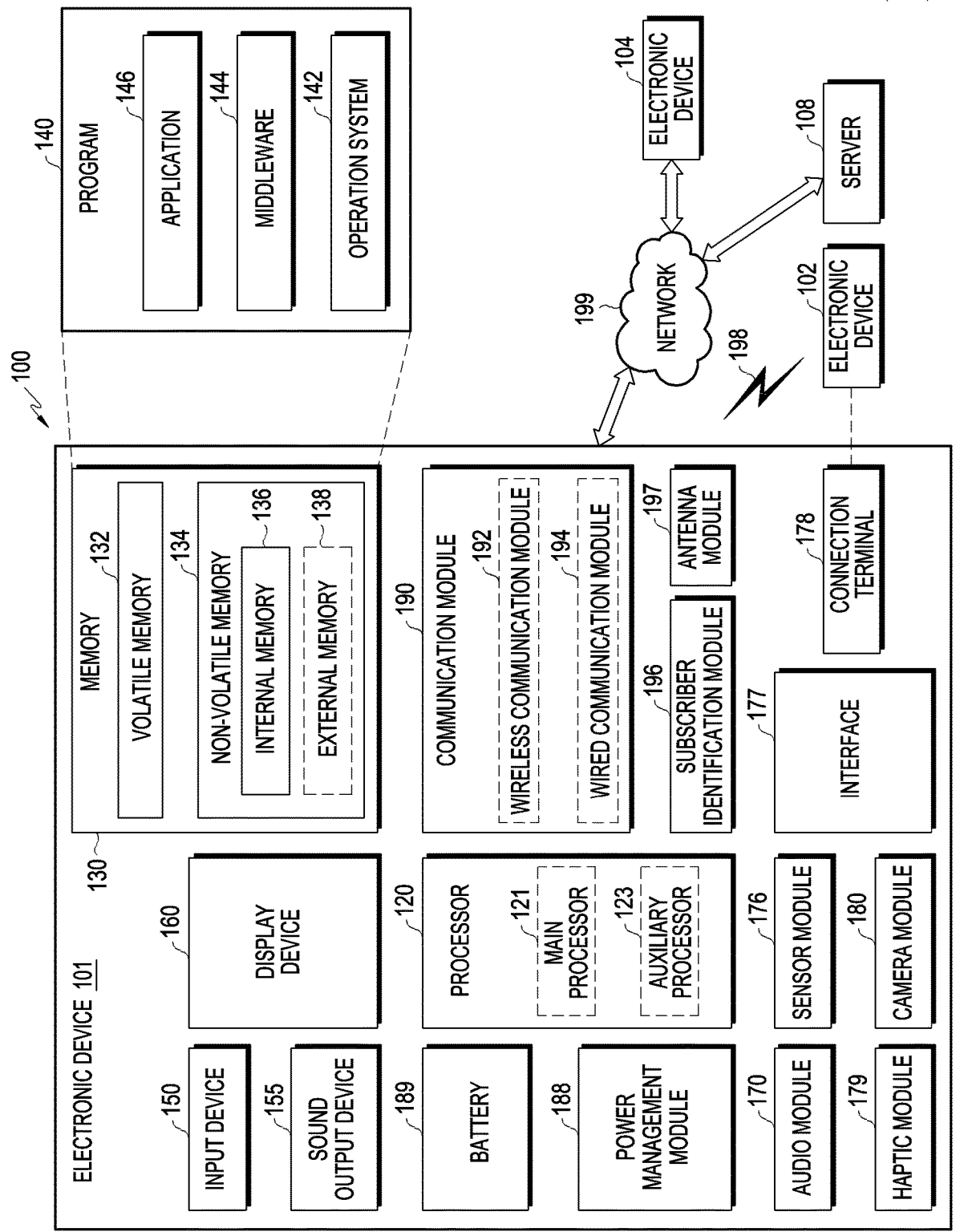
FIG. 1 is a block diagram illustrating an electronic device in a network environment according to an embodiment of the disclosure.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
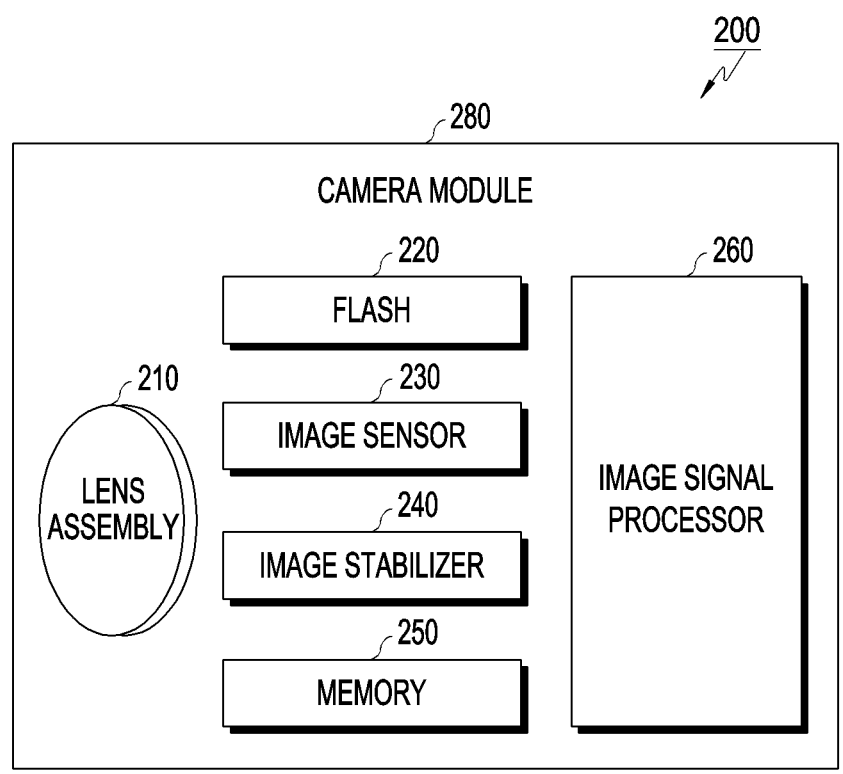
FIG. 2 is a block diagram illustrating a camera module (e.g., the camera module of FIG. 1) according to various embodiments of the disclosure.

FIG. 2 is a block diagram illustrating a camera module (e.g., the camera module of FIG. 1) according to various embodiments of the disclosure.

Referring to FIG. 2, a camera module 280 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 101 including the camera module 180. This allows compensating for at least part of a negative effect (e.g., image blurring) that the movement has on an image being captured. According to an embodiment, the image stabilizer 240 may sense such a movement by the camera module 280 or the electronic device 101 using a gyro sensor (not shown) or an acceleration sensor (not shown), which is disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding image copy (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored in the memory 250 for further processing, or may be provided to an external component (e.g., the memory 130, the display device 160, the electronic device 102, the electronic device 104, or the server 108) outside the camera module 280. According to an embodiment, the image signal processor 260 may be configured as at least part of the processor 120, or as a separate processor that is operated independently from the processor 120. If the image signal processor 260 is configured separately from the processor 120, at least one image processed by the image signal processor 260 may be displayed, by the processor 120, via the display device 160 as it is or after being further processed.

According to an embodiment, the electronic device 101 may include a plurality of camera modules 280 having different attributes or functions. In such a case, at least one of the plurality of camera modules 280 may form, for example, a wide-angle camera and at least another of the plurality of camera modules 180 may form a telephoto camera. Similarly, at least one of the plurality of camera modules 280 may form, for example, a front camera and at least another of the plurality of camera modules 180 may form a rear camera.

Figure 3:
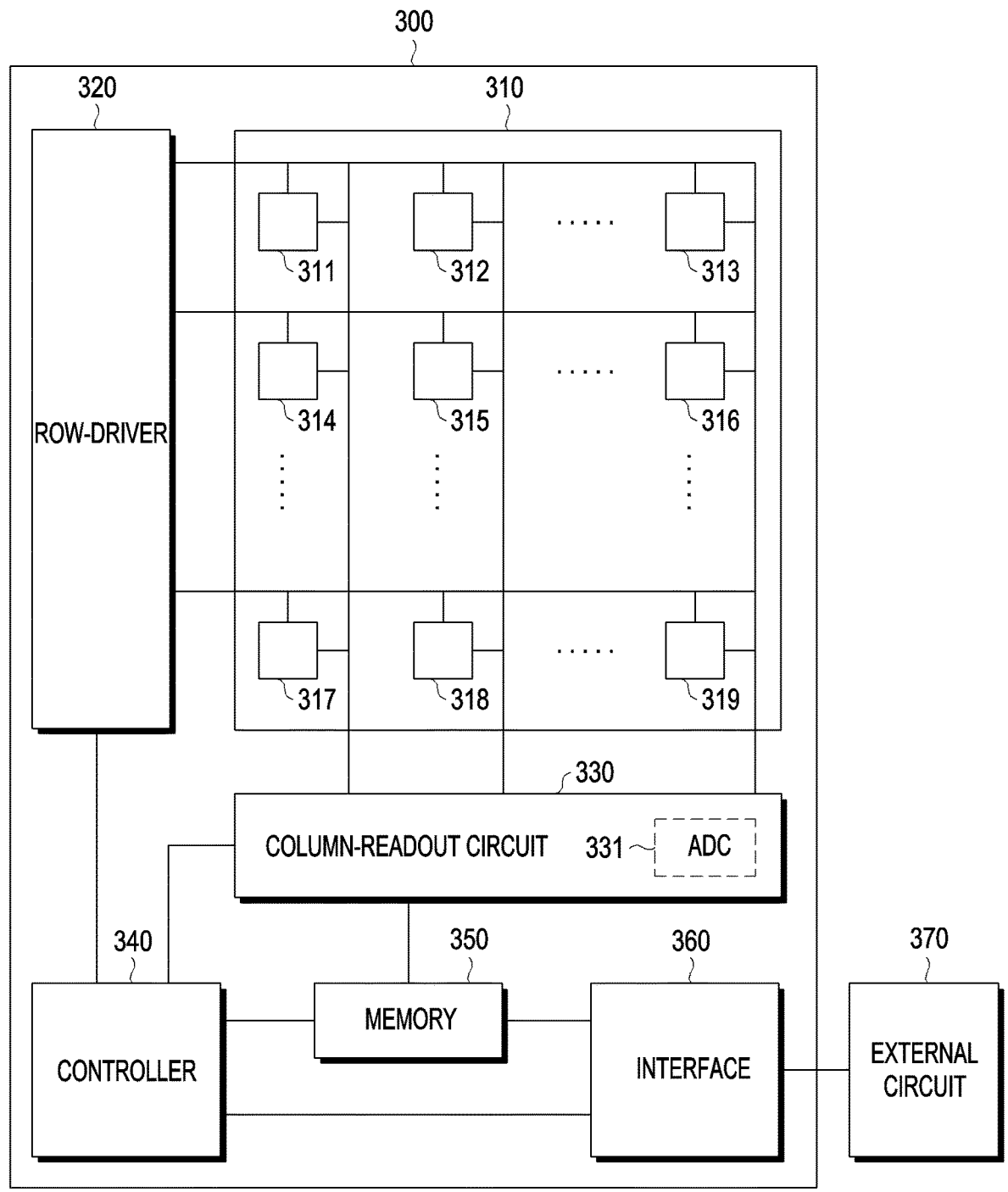
FIG. 3 is a block diagram illustrating a structure of an image sensor according to an embodiment of the disclosure.

FIG. 3 is a block diagram illustrating a structure of an image sensor according to an embodiment of the disclosure.

According to an embodiment of the disclosure, an image sensor 300 may be a component of a camera module (e.g., the camera module 180 or the camera module 280) in an electronic device (e.g., the electronic device 101).

Referring to FIG. 3, according to an embodiment, the image sensor 300 (e.g., the image sensor 230) may include at least one of a pixel array 310, a row-driver 320, a column-readout circuit 330, a controller 340, a memory 350, or an interface 360.

The pixel array 310 may include a plurality of pixels 311 to 319. For example, the pixel array 310 may have a structure in which the plurality of pixels 311 to 319 are arrayed in an M×N matrix pattern (where M and N are positive integers). The pixel array 310 where the plurality of pixels 311 to 319 are arrayed in a two-dimensional (2D) M×N pattern that may have M rows and N columns. The pixel array 310 may include a plurality of photosensitive elements, e.g., photodiodes or pinned photodiodes. The pixel array 310 may detect light using the plurality of photosensitive elements and convert the light into an analog electrical signal to generate an image signal.

The row-driver 320 may drive the pixel array 310 for each row. For example, the row-driver 320 may output transmission control signals to the transmission transistors of the plurality of pixels 311 to 319 in the pixel array 310, reset control signals to control reset transistors, or selection control signals to control selection transistors to the pixel array 310. The row-driver 320 may determine a row to be read out.

The column-readout circuit 330 may receive analog electrical signals generated by the pixel array 310. For example, the column-readout circuit 330 may receive an analog electrical signal from a column line selected from among the plurality of columns constituting the pixel array 310. The column-readout circuit 330 may include an analog-digital converter (ADC) 331 that may convert the analog electrical signal that is received from the selected column line into pixel data (or a digital signal) and output the pixel data. Meanwhile, the column-readout circuit 330 receiving of an analog electrical signal from the pixel array 310, converting of the received analog electrical signal into pixel data using the ADC 331, and outputting of the pixel data may be referred to as read-out. The column-readout circuit 330 and the ADC 331 may determine a column to be read out.

According to an embodiment of the disclosure, the column-readout circuit 330 of the image sensor 300 that supports slow motion recording may include a plurality of ADCs 331. Each of the plurality of ADCs 331 may be connected in parallel with a respective photodiodes in the pixel array 310, and analog electrical signals simultaneously received from the photodiodes may quickly be converted into pixel data based on the parallel structure. The column-readout circuit 330 of the image sensor 300 that supports slow motion recording may perform a read-out at a high frame rate (e.g., 960 frames per second (fps)). For example, reading out at 960 fps means that receiving an analog electrical signal from the pixel array 310, converting the received analog electrical signal into pixel data using the ADC 331, and outputting the pixel data are performed once every 1/960 seconds. In other words, reading out at 960 fps may mean that 960 image frames are outputted every second.

The controller 340 may obtain an image frame based on the pixel data received from the column-readout circuit 330. The controller 340 may output the image frame through the interface 360 to an external circuit 370 (e.g., an ISP, processor, communication circuit, or external server). According to an embodiment of the disclosure, the controller 340 may generate transmission control signals to control the transmission transistors of the plurality of pixels 311 to 319, reset control signals to control reset transistors, or selection control signals to control selection transistors and provide the generated signals to the row-driver 320. The controller 340 may generate a selection control signal to select at least one column line from among the plurality of column lines constituting the pixel array 310 and provide the generated signal to the column-readout circuit 330. For example, the column-readout circuit 330 may enable some of the plurality of column lines and disable the other column lines based on selection control signals provided from the controller 340. The controller 340 may be implemented in a processor (e.g., the electronic device 120) including a CPU or AP, an integrated circuit, or a module. When the controller 340 is implemented as an integrated circuit, the controller 340 may include a subtractor for detecting a difference between, e.g., images, or a comparator for comparing images. According to an embodiment of the disclosure, the controller 340 may downsize read-out images and compare the plurality of downsized images to detect differences between the images.

The memory 350 may include a volatile and/or non-volatile memory. The memory 350 is a storage device inside the image sensor 300. The memory 350 may include a buffer memory. According to an embodiment of the disclosure, the memory 350 may temporarily store digital signals output from the column-readout circuit 330 or the controller 340. For example, the memory 350 may include at least one image frame obtained based on light received by the pixel array 310. The memory 350 may store at least one digital signal received from the external circuit 370 through the interface 360.

According to an embodiment of the disclosure, the memory 350 may store at least one image frame read out at an Nth frame rate (e.g., 960 fps) or an Mth frame rate (e.g., 120 fps) from the column-readout circuit 330 and deliver at least one image frame stored through the interface 360 to the external circuit 370 (e.g., an IPS, processor, communication circuit, or external server). In other words, the memory 350 may store at least one image frame read out once every $1/960$ seconds or every $1/120$ seconds from the column-readout circuit 330, and the memory 350 may deliver at least one image frame stored through the interface 360 to the external circuit 370. The speed at which the image frame is transferred to the external circuit 370 is not limited thereto. According to an embodiment, the electronic device 101 may immediately transfer, without storing, the read-out image frame through the interface 360 to the external circuit 370.

Meanwhile, the controller 340 may store only some of N image frames read out through the column-readout circuit 330 at the Nth frame rate (e.g., 960 fps) in the memory 350, allowing for substantially the same effect as if M image frames are obtained which are read out at the Mth frame rate (e.g., 120 fps). For example, the controller 340 may store only one of eight image frames read out at 960 fps for $8/960$ seconds in the memory 350. When, from among a plurality of image frames read out at 960 fps, image frames selected at the ratio of 1:8 are stored in the memory 350, and the image frames stored in the memory 350 may be substantially the same image frames as those read out at 120 fps through the column-readout circuit 330. For example, when a video constituted of only image frames obtained at the cycle of $1/120$ seconds is defined as "120 fps video," a video constituted of only image frames selected in the ratio of 1:8 from among the plurality of image frames read out at 960 fps may be defined as a 120 fps video. A video constituted of only image frames read out at 120 fps through the column-readout circuit 330 may also be defined as a 120 fps video.

The interface 360 may include, e.g., the interface 177 or the communication module 190. The interface 360 may connect components of the image sensor 300, e.g., the controller 340 or the memory 350, with the external circuit 370 in a wireless or wired scheme. For example, the interface 360 may deliver at least one image frame stored in the memory 350 of the image sensor 300 to the external circuit 370, e.g., the memory (e.g., the memory 130) of the electronic device (e.g., the electronic device 101). The interface 360 may also deliver control signals from the processor (e.g., the processor 120) of the electronic device (e.g., the electronic device 101) to the controller 340 of the image sensor 300.

According to an embodiment of the disclosure, the image sensor 300 may communicate with the external circuit 370 through the interface 360, e.g., in a serial communication scheme. For example, the memory 350 of the image sensor 300 may communicate with the processor (e.g., the processor 120) of the electronic device (e.g., the electronic device 101) in an inter-integrated circuit (I²C) scheme.

According to an embodiment of the disclosure, the image sensor 300 may connect with the external circuit 370 through the interface 360, e.g., an interface as defined based on the MIPI protocol. For example, the memory 350 of the image sensor 300 may communicate with the processor (e.g., processor 120) of the electronic device (e.g., the electronic device 101) using the interface defined in the MIPI protocol. The interface 360, e.g., the interface defined based on the MIPI protocol, may deliver pixel data corresponding to the image frames stored in the memory 350 to the external circuit 370 at the cycle of $1/120$ seconds.

Meanwhile, while the image frames stored in the memory 350 are delivered through the interface 360 having an output speed of 240 fps to the external circuit 370 once every $1/120$ seconds, at least some of the image frames read out in real-time through the column-readout circuit 330 may be delivered to the external circuit 370 as preview images once every $1/120$ seconds. The processor 120 in the external circuit 370 may display, through the display, all or some of the image frames output as preview images from the image sensor 300 at 30 fps or 60 fps.

All or some of the above-described components 310 to 360 may be included in the image sensor 300 as necessary, and each component may be configured in a single unit or multiple units. The frame rates 120 fps, 240 fps, and 960 fps, used in the above embodiments may be varied depending on the settings of the electronic device or the performance of the interface.

Figure 4:
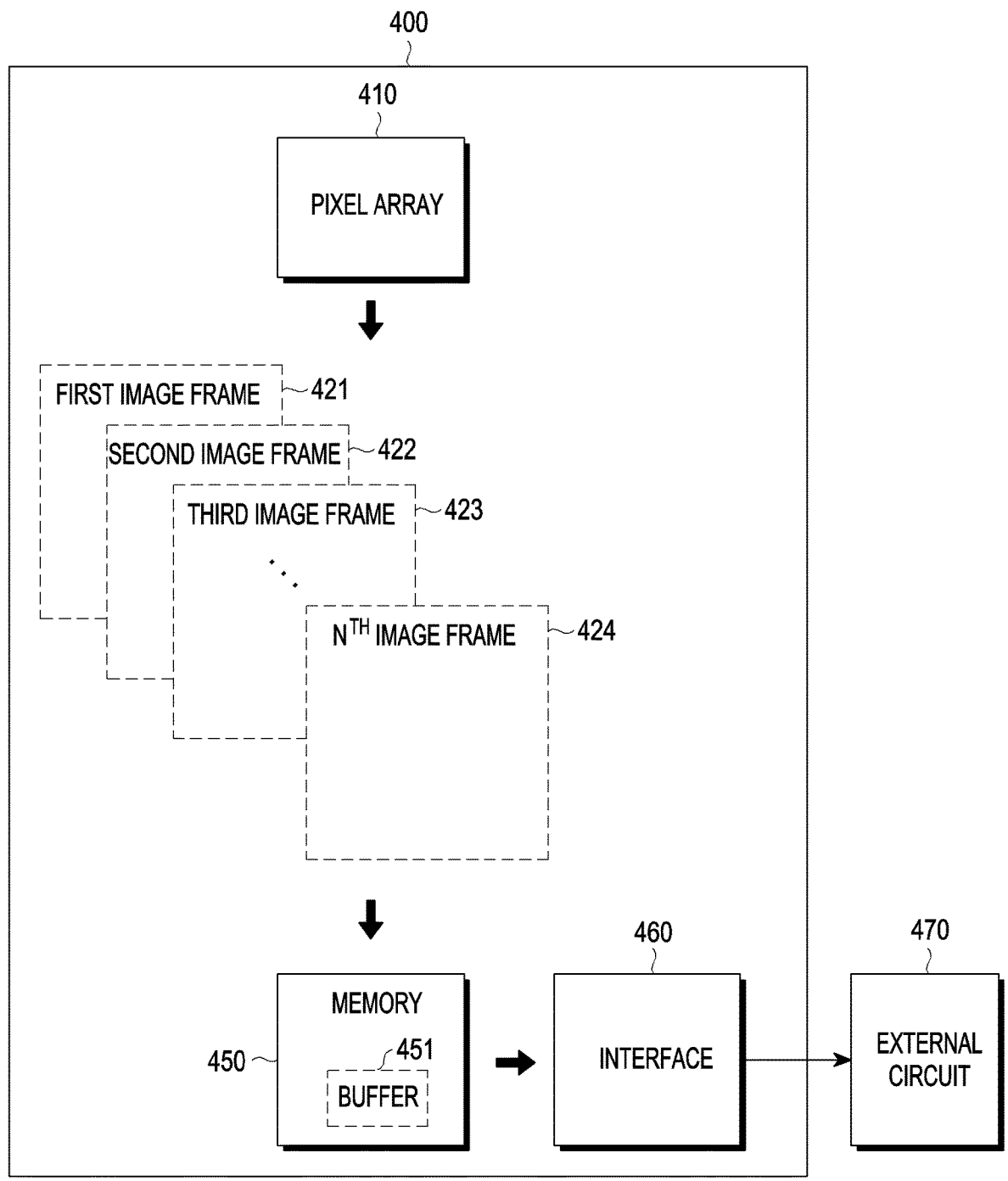
FIG. 4 is a block diagram illustrating a process for obtaining an image frame through an image sensor according to an embodiment of the disclosure.

FIG. 4 is a block diagram illustrating a process for obtaining an image frame through an image sensor according to an embodiment of the disclosure.

Referring to FIG. 4, an image sensor 400 may be a component of a camera module (e.g., the camera module 180 or the camera module 280) in an electronic device (e.g., the electronic device 101). The image sensor 400 may include at least one a pixel array 410, a memory 450, and an interface 460. The image sensor 400 may include the whole or part of the image sensor 300 of FIG. 3.

The pixel array 410 of the image sensor 400 may output an electrical signal corresponding to light received from the outside. For example, the pixel array 410 may include a plurality of pixels constituted of photodiodes. The photodiodes may receive light and generate analog electrical signals corresponding to the received light. Analog electrical signals generated from the plurality of photodiodes constituting the plurality of pixels may be converted into a plurality of pieces of pixel data through a column-readout circuit (e.g., the column-readout circuit 330). In this case, each piece of pixel data may mean a pixel value corresponding to its respective pixel. A set of a plurality of pieces of pixel data obtained at a particular time may constitute at least one image frame.

According to an embodiment of the disclosure, the pixel array 410 of the image sensor 400 may output a plurality of image frames 421 to 424 at a preset read-out speed. For example, when the read-out speed is set to 960 fps, the image sensor 400 may read-out 960 image frames every second based on light received by the pixel array 410. According to an embodiment, the electronic device 101 may detect an event of slow motion recording while recording in a normal mode in which case the electronic device 101 may increase the read-out rate from 120 fps to 960 fps.

The plurality of image frames 421 to 424 read out may be stored in a memory 450 inside the image sensor 400. According to an embodiment of the disclosure, the memory 450 of the image sensor 400 may include a buffer memory 451. For example, some of the plurality of image frames 421 to 424 read out at 960 fps may be stored in the buffer memory 451. From among a plurality of image frames continuously read out, a designated number of image frames may be stored in the buffer memory 451. The processor (e.g., the processor 120 or the controller 340) may repeat the operations of deleting the image frame stored earliest among the image frames stored in the buffer memory 451 and storing the image frame latest among the image frames.

At least one image frame stored in the memory 450 of the image sensor 400 may be delivered to an external circuit 470 through an interface 460 (e.g., the interface 360). For example, the processor (e.g., the processor 120 or the controller 340) may control the interface 460 to deliver at least one image frame stored in the memory 450 to the external circuit 470.

According to an embodiment, the image sensor 400 may exclude the buffer memory 451. The image frames 421, 422, 423, and 424 from the pixel array 410 may directly be transferred through the interface 460 to the external circuit 470.

Figure 5:
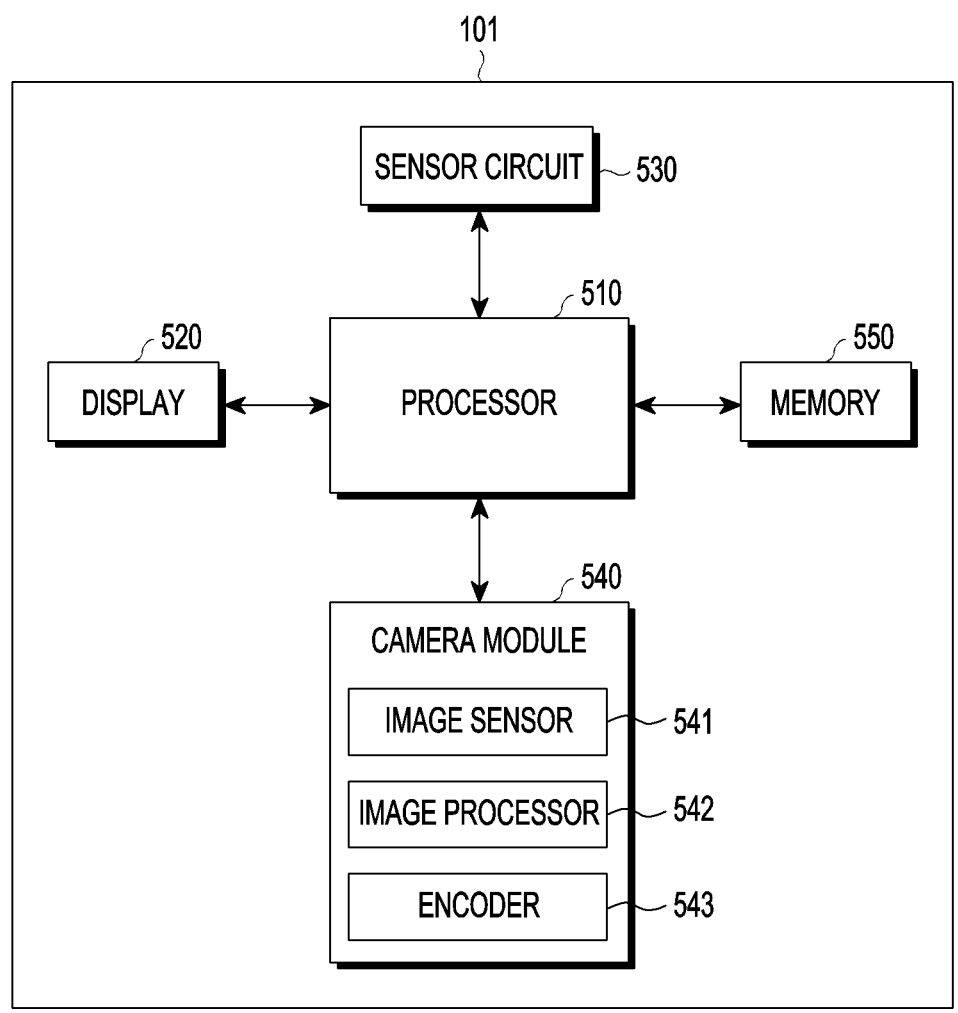
FIG. 5 is a block diagram illustrating an electronic device according to an embodiment of the disclosure.

FIG. 5 is a block diagram illustrating an electronic device according to an embodiment of the disclosure.

Referring to FIG. 5, an electronic device 101 may include a processor 510, a display 520, a sensor circuit 530, a camera module 540, and a memory 550. According to an embodiment, the processor 510 (e.g., the processor 120 of FIG. 1) may control the display 520 (e.g., the display device 160), the sensor circuit 530 (e.g., the sensor module 176), the camera module 540 (e.g., the camera module 180 or 280), and the memory 550 (e.g., the memory 130) connected with the processor 510 and perform various types of data processing or computation. For example, the processor 510 may obtain sensor data from the sensor circuit 530 and set a reference threshold for slow motion recording using the sensor data. The processor 510 may obtain a slow motion video in response to an object (e.g., one in an image) moving at the threshold using the camera module 540. The processor 510 may display on the display 520, or store in the memory 550, a plurality of image frames constituting the slow motion video.

According to an embodiment, the display 520 (e.g., the display device 160 of FIG. 1) may display at least one image frame obtained through the image sensor 541 (e.g., the image sensor 230 of FIG. 2). For example, the display 520 may display the preview image generated through the image processor 542 or at least one video stored in the memory 550.

According to an embodiment, the sensor circuit 530 (e.g., the sensor module 176 of FIG. 1) may sense the movement of the electronic device 101 using at least one sensor (e.g., a gyro sensor or an acceleration sensor). The sensor circuit 530 may transfer data regarding the movement of the electronic device 101 to the processor 510 or the camera module 540.

According to an embodiment, the camera module 540 (e.g., the camera module 180 of FIG. 1 or the camera module 280 of FIG. 2) may include an image sensor 541 (e.g., the image sensor 230), an image processor 542 (e.g., the image signal processor 260), and an encoder 543. Meanwhile, at least any one of the components 541, 542, and 543 in the camera module 540 may be designed in hardware, software, firmware, or in other various forms, and each component may be termed with a different name.

According to an embodiment, the image processor 542 may receive at least one piece of pixel data output from the image sensor 541 and process or edit the received pixel data for delivery to at least one component of the electronic device. The image processor 542 may resize the image frame corresponding to the pixel data received from the image sensor 541 to be displayed through the display 520. As an example, a "preview image" corresponds to an image that is displayed on the display 520 when the user takes an image of at least one object using the camera module 540 of the electronic device 101. At least one image frame obtained through the image sensor 541 may be displayed in real-time on the display 520 as a preview image, and the user of the electronic device may easily take images of the external object through the preview image.

According to an embodiment, the encoder 543 may generate at least one video based on the pixel data processed by the image processor 542. For example, the encoder 543 may compress an image frame corresponding to the pixel data received from the image sensor 541 to be stored in the memory 550. Further, the encoder 543 may encode image frames corresponding to a plurality of pieces of pixel data received from the image sensor 541. The encoder 543 may array the plurality of image frames in the order obtained through the image sensor 541 based on the plurality of pieces of pixel data received from the image sensor 541. The processor 510 may store the video encoded by the encoder 543 in the memory 550.

According to an embodiment, at least one of the image processor 542 or the encoder 543 may be included not in the camera module 540 but in the processor 510.

According to an embodiment, the memory 550 (e.g., the memory 130) may store at least one image frame obtained through the image sensor 541 or at least one video encoded through the encoder 543. Meanwhile, the image sensor 541 may include at least one memory (e.g., memory 350), in which case the memory 550 may mean a different storage space positioned in a place separated from the memory 350.

An electronic device, and a method for operating the same described below provide a predetermined control function on a slow motion video.

Figure 6:
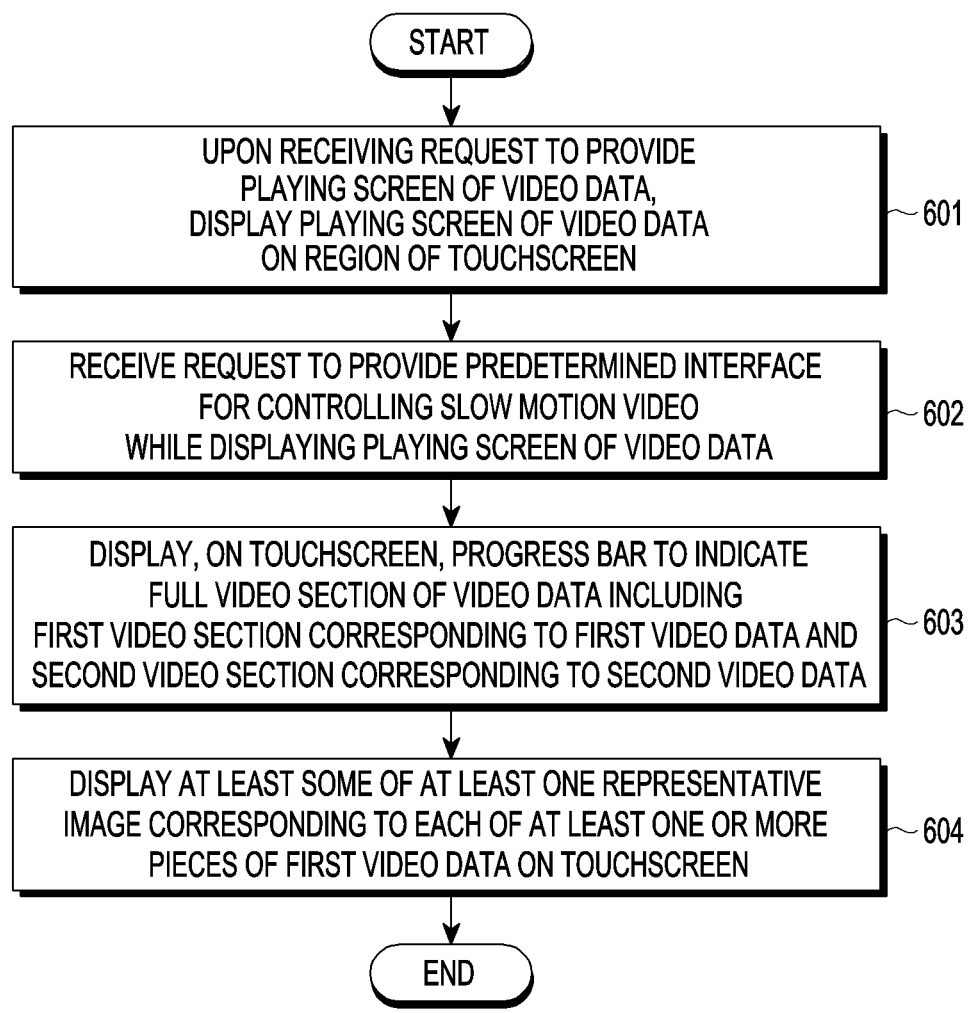
FIG. 6 is a flowchart illustrating operations of an electronic device to provide a predetermined control function for a slow motion video according to an embodiment of the disclosure.

FIG. 6 is a flowchart illustrating operations of an electronic device to provide a predetermined control function for a slow motion video according to an embodiment of the disclosure.

Figure 7:
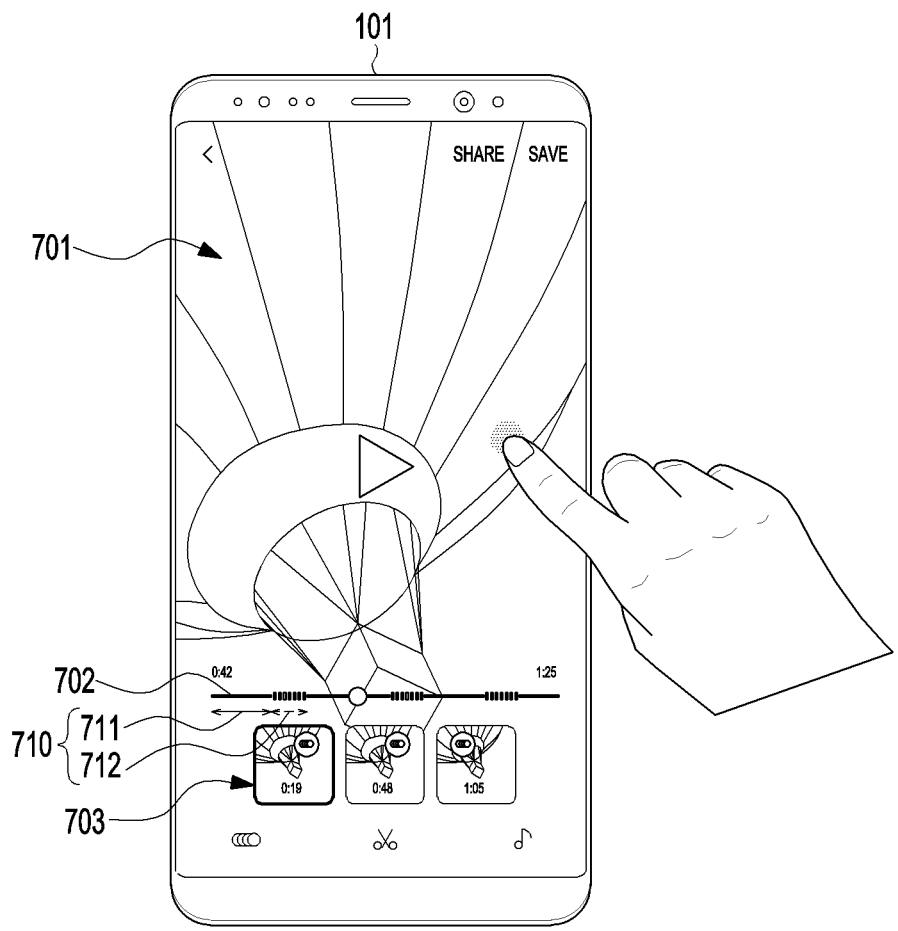
FIG. 7 is a view illustrating operations of an electronic device to provide a predetermined control function for a slow motion video according to an embodiment of the disclosure.

FIG. 7 is a view illustrating operations of an electronic device to provide a predetermined control function for a slow motion video according to an embodiment of the disclosure.

Referring to FIGS. 6 and 7, according to an embodiment, an electronic device 101 (e.g., the processor 120 or the image signal processor 260) may display a predetermined interface for controlling slow motion video on a touchscreen. The term "slow motion video" may be interchangeably used with "video data." Thus, the term "slow motion video" described below may be interpreted as video data, and that "video data" may be interpreted as slow motion video. Slow motion video may mean a video containing image frames recorded at a relatively high frame rate. As described below, the phrase "an electronic device plays video data" indicates that the electronic device is displaying a playing screen 701 of the video data on the touchscreen. However, the phrase "an electronic device plays video data" is not limited in meaning thereto.

In operation 601, according to an embodiment, an electronic device 101 (e.g., the processor 120 or the image signal processor 260), upon receiving a request to provide a playing screen 701 of video data, may display the playing screen 701 of video data on a region of the touchscreen. The video data may include at least one or more pieces of first video data and at least one or more pieces of second video data. The first video data and the second video data are described in detail below. The video data playing screen 701 displayed on the touchscreen may be in the state of playing or pausing.

In operation 602, according to an embodiment, the electronic device 101 (e.g., the processor 120 or the image signal processor 260) may receive a request to provide a predetermined interface to control slow motion video while displaying the video data playing screen 701.

Referring to FIG. 7, for example, the reception of the request to provide the interface may be performed by detecting a touch on at least a point on the touchscreen displaying the video data playing screen 701. The interface providing request is not limited in type.

In operation 603, according to an embodiment, in response to the reception of the interface providing request, the electronic device 101 (e.g., the processor 120 or the image signal processor 260) may display, on the touchscreen, a progress bar 702 to indicate a full video section 710 for the video data including a first video section 711 corresponding to first video data and a second video section 712 corresponding to second video data. The electronic device 101 (e.g., the processor 120 or the image signal processor 260) may provide a predetermined control function through the progress bar 702. For example, upon receiving a request for the time point of playing the video data playing screen 701 through the progress bar 702, the electronic device 101 may display the video data playing screen 701 corresponding to the time point on the touchscreen in response to the request. The electronic device 101 (e.g., the processor 120 or the image signal processor 260) may display the progress bar 702 to allow the first video section 711 and the second video section 712 to be visually distinguishable from each other by the user, which is described below.

In operation 604, according to an embodiment, in response to the reception of the interface providing request, the electronic device 101 (e.g., the processor 120 or the image signal processor 260) may display representative images corresponding to each of at least one or more pieces of first video data. A representative image may be a thumbnail image of one of the image frames included in the first video section 711. For example, as shown in FIG. 7, the electronic device 101 (e.g., the processor 120 or the image signal processor 260) may display at least some of the representative images corresponding to the first video data in a position adjacent the progress bar 702 displayed on the touchscreen. The electronic device 101 (e.g., the processor 120 or the image signal processor 260) may provide a predetermined control function for slow motion video through at least some of the representative images displayed on the touchscreen. For example, the control function may include at least one of the time point of the slow motion video playing screen 701, the playing speed of the slow motion video, editing, storing, or sharing the slow motion video. The control function is described below in detail.

Operations 601 to 604 described above are not limited thereto, but may instead be performed in various orders. For example, although it has been described above that operation 604 is performed later than operation 603, operation 604 may be performed earlier than operation 603 without being limited thereto.

Although it has been described above that at least some of the representative images and the progress bar 702 are displayed on the touchscreen while the video data playing screen 701 is being displayed, embodiments of the disclosure are not limited thereto. For example, at least some of the representative images and the progress bar 702 may be displayed on the touchscreen even while the video data playing screen 701 is not displayed.

In response to the reception of the interface providing request, the electronic device may display at least part 703 of the representative image and the progress bar 702 on the touchscreen and provide a control function for slow motion video through the displayed progress bar 702 and representative image, allowing the user more utility of slow motion video. In other words, the user may easily control slow motion video based on the progress bar 702 and the representative image, allowing the user more utility of slow motion video.

A control function of slow motion video provided based on the progress bar 702 and a representative image displayed by the electronic device is described below in detail. Prior to the description of the slow motion video control function provided by the progress bar 702 and the representative image, recording and playing a slow motion video are described.

Figure 8:
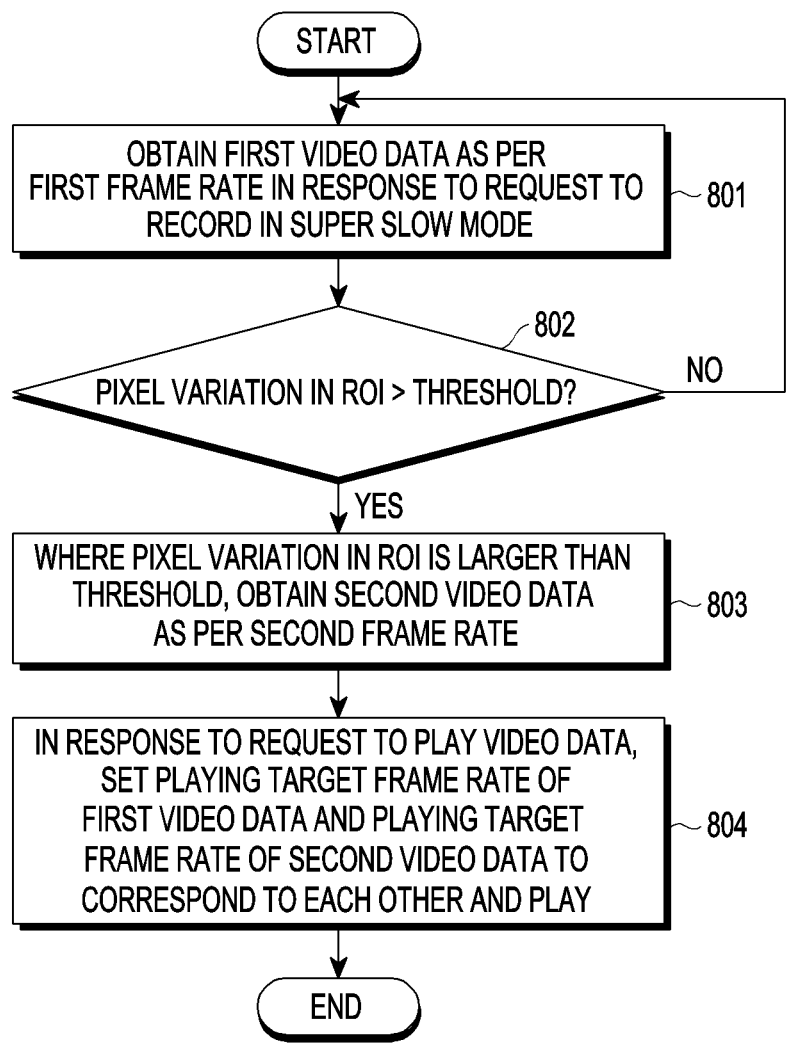
FIG. 8 is a flowchart illustrating an example of recording and playing a slow motion video according to an embodiment of the disclosure.

FIG. 8 is a flowchart illustrating an example of recording and playing a slow motion video according to an embodiment of the disclosure.

Figure 9:
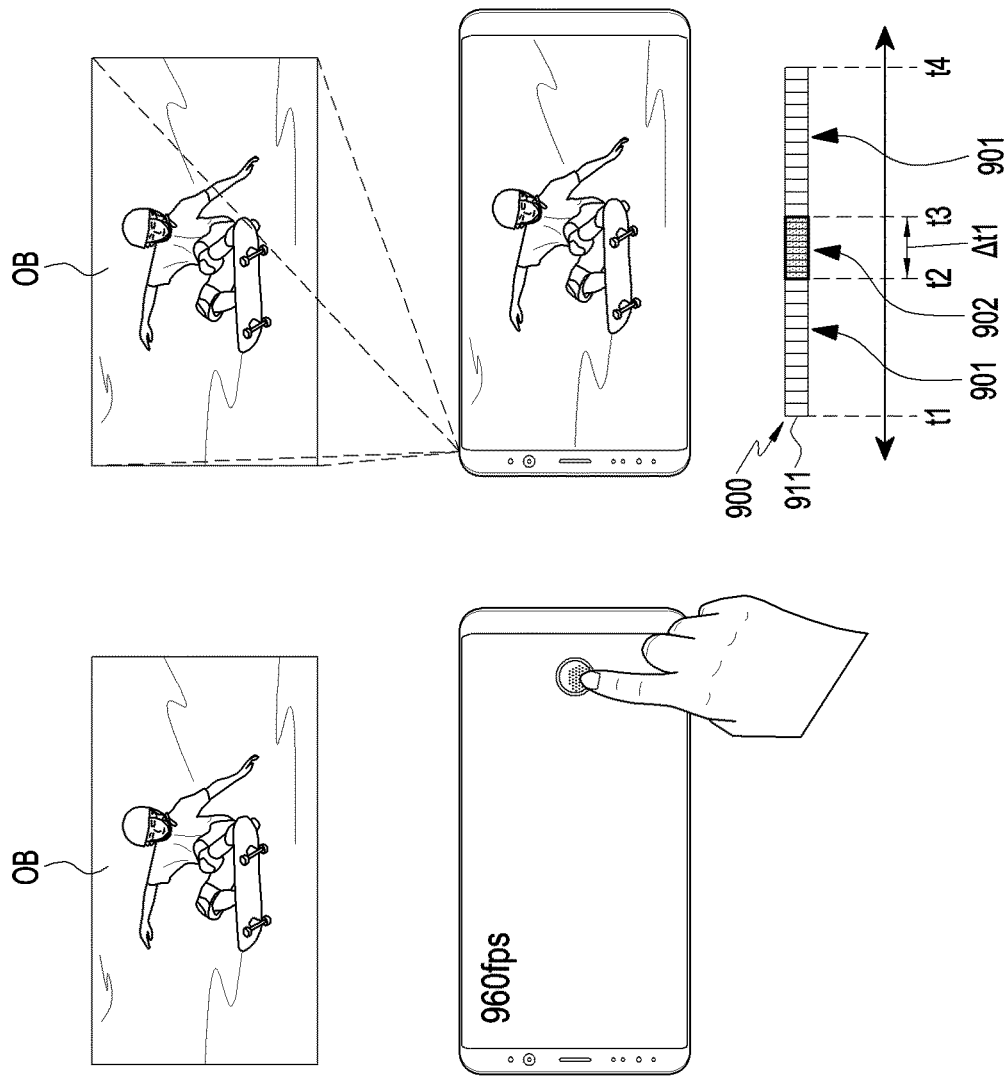
FIG. 9 is a view illustrating an example of recording and playing a slow motion video according to an embodiment of the disclosure.
Figure 9:
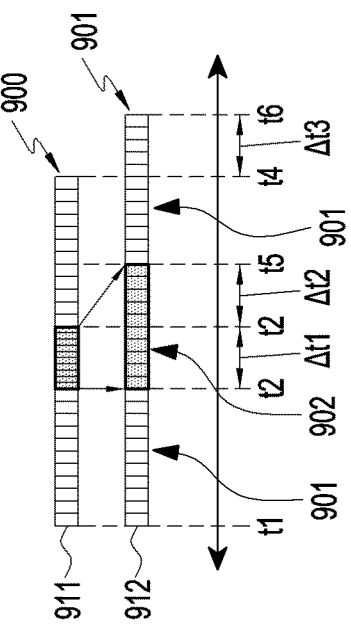

FIG. 9 is a view illustrating an example of recording and playing a slow motion video according to an embodiment of the disclosure.

Referring to FIGS. 8 and 9, according to an embodiment, an electronic device 101 (e.g., the processor 120 or the image signal processor 260) may record and play a slow motion video. The electronic device 101 (e.g., the processor 120 or the image signal processor 260) may obtain a slow motion video at a predetermined frame rate 911 and may play the obtained slow motion video at a frame rate 912 relatively lower than the predetermined frame rate 911. The frame rate 911 may include a first frame rate for recording at a relatively low speed and a second frame rate for recording at a relatively high speed.

For ease of description, the frame rate at which video data 900 is played is referred to as a playing target frame rate 912. In other words, the playing target frame rate 912 may be defined as a frame rate for a playing screen 701 of video data 900 displayed on the touchscreen. However, the playing target frame rate 912 is not limited to the definition in the disclosure but may instead be interpreted as a frame rate used in the art.

Operations in which the electronic device obtains video data 900 at a predetermined frame rate 911 and plays the video data are described below in detail.

First, an example in which the electronic device obtains the video data 900 is described.

According to an embodiment, the electronic device 101 (e.g., the processor 120 or the image signal processor 260) may obtain video data 900 including at least one or more pieces of first video data 901 obtained at a first frame rate and at least one or more pieces of second video data 902 obtained at a second frame rate higher than the first frame rate.

Referring to FIG. 9, the electronic device 101 (e.g., the processor 120 or the image signal processor 260) may obtain the first video data 901 at a first frame rate from a first time point t1 to a second time point t2, the second video data 902 at a second frame rate from the second time point t2 to a third time point t3, and the first video data 901 at a first frame rate from the third time point t4 to a fourth time point t4. The first time point t1 is when a super slow mode request (or a video storage request) is detected. The second time point t2 is when the second video data 901 is obtained at the second frame rate. For example, the second time point t2 is when a variation in pixel value in a region of interest exceeds a threshold or when a super slow motion recording request is manually detected by the user. The third time point t3 may be defined as a time point when obtaining the second video data 902 is terminated. The fourth time point t4 is when the video recording is terminated. The time points are described below in greater detail.

According to an embodiment, the first frame rate may be, but is not limited to, 30 fps, and be determined to be other various frame rates 911. For example, the various frame rates 911 may be 30 fps multiplied by an integer, such as 60 fps, 90 fps, or 120 fps.

In operation 802, according to an embodiment, the electronic device 101 (e.g., the processor 120 or the image signal processor 260) may determine whether the variation in a pixel in a region of interest (ROI) is larger than a threshold. In other words, as shown in FIG. 9, the electronic device 101 (e.g., the processor 120 or the image signal processor 260) may catch an external object OB that dynamically varies at the second time point.

Specifically, according to an embodiment, the electronic device 101 (e.g., the processor 120 or the image signal processor 260) may compare the threshold with pixel variations in ROI in image frames using at least two of a plurality of image frames read out.

For example, the electronic device 101 (e.g., the processor 120 or the image signal processor 260) may detect a variation in pixel value in the ROI (e.g., at least one of the ROI or background region) based on at least two of a plurality of image frames read out near the second time point. As a specific example, the electronic device 101 (e.g., the processor 120 or the image signal processor 260) may detect a variation in pixel values in the ROI by comparing the ROI of at least one of a plurality of image frames read out through a column-readout circuit 330 at a time point before the second time point and the ROI of at least one of a plurality of image frames read out through the column-readout circuit at the second time point. Accordingly, the electronic device 101 (e.g., the processor 120 or the image signal processor 260) may obtain the variation in pixel value in ROI.

At this time, the electronic device 101 (e.g., the processor 120 or the image signal processor 260) may compare the detected variation in pixel value in ROI with a threshold. For example, the electronic device 101 (e.g., the processor 120 or the image signal processor 260) may set a threshold for initiating slow motion recording based on the detected variation in pixel value. The threshold may be set based on at least one of the movement of the electronic device 101, the illuminance of the outside of the electronic device 101, or the size of the ROI.

When the variation in pixel value in the ROI is larger than the threshold, the electronic device 101 (e.g., the processor 120 or the image signal processor 260) may determine that the second time point is the time point when the external object OB dynamically varies. In other words, the electronic device 101 (e.g., the processor 120 or the image signal processor 260) may determine the second time point as a time point to initiate slow motion recording on the electronic device as described below.

In operation 803, according to an embodiment, when the variation in pixel value in the ROI is larger than the threshold, the electronic device 101 (e.g., the processor 120 or the image signal processor 260) may obtain the second video data 902 at the second frame rate. As shown in FIG. 9, the electronic device 101 (e.g., the processor 120 or the image signal processor 260) may obtain the second video data 902 at the second frame rate from the second time point to the third time point, initiating slow motion recording. In turn, the second video data 902 may be constituted of image frames for the external object OB dynamically varying. In operation 803, the electronic device may capture a video of the dynamically varying external object OB at a high frame rate even without the user's control, thus providing the user more convenient slow motion recording.

As a specific example, according to an embodiment, the electronic device 101 (e.g., the processor 120 or the image signal processor 260) may set the read-out speed, which is the output speed of the column-readout circuit, as the second frame rate at the second time point and obtain the second video data 902 at the second frame rate. In other words, when the electronic device sets the read-out speed, which is the output speed of the column-readout circuit, as the second frame rate, the image frames obtained through the image sensor may be output at the second frame rate, and the image frames output at the second frame rate may constitute the second video data 902. That is, the second video data 902 may be obtained at the second frame rate through the image sensor.

As another specific example, according to an embodiment, the electronic device 101 (e.g., the processor 120 or the image signal processor 260) may determine the third time point of terminating the obtaining of the second video data 902 at the second frame rate. For example, the third time point may be a time point determined for the variation in pixel value in the ROI in consecutive image frames becomes smaller than or equal to the threshold. For example, the third time point may be a time point determined to be a predetermined first time after the second time point. From the third time point to the fourth time point, the electronic device 101 (e.g., the processor 120 or the image signal processor 260) may set the read-out speed, which is the output speed of the column-readout circuit, as the first frame rate and re-obtain the first video data 901 at the first frame rate. At this time, the fourth time point may be a time point of terminating the super slow mode recording. For example, the fourth time point may be a time point at which a request for terminating the super slow mode recording is detected. The request for terminating the super slow mode recording may be the user's touch on an electronic key implemented on the touchscreen of the electronic device. Without being limited thereto, the request for terminating the super slow mode recording may be a touch on a physical key implemented on the electronic device or a voice input to the electronic device.

According to an embodiment, the second frame rate may be 960 fps, but without being limited thereto, may be determined to be other various frame rates 911 higher than the first frame rate. For example, the various frame rates 911 may be 1/n times 960 fps, such as 60 fps, 90 fps, or 120 fps.

Although the variation in pixel value in the ROI is larger than the threshold in the above example, the above-described operations may also be performed when the variation in pixel value in the ROI is equal to the threshold according to an embodiment.

As a result of operations 801 to 803 described above, the electronic device 101 (e.g., the processor 120 or the image signal processor 260) may obtain video data 900 including the first video data 901 and the second video data 902.

An example of playing video data 900 on the electronic device is described below.

In operation 804, according to an embodiment, in response to a request for playing the video data 900, the electronic device 101 (e.g., the processor 120 or the image signal processor 260) may set a playing target frame rate 912 for the first video data 901 and a playing target frame rate 912 for the second video data 902, and display the playing screen 701 of the video data 900.

For example, the playing request may be the user's touch on an electronic key implemented on the touchscreen of the electronic device. Without being limited thereto, the playing request may be a touch on a physical key implemented on the electronic device or a voice input to the electronic device.

For example, as shown in FIG. 9, the electronic device 101 (e.g., the processor 120 or the image signal processor 260) may set the playing target frame rate 912 for the first video data 901 and the playing target frame rate 912 for the second video data 902 to correspond to each other. As a specific example, as shown in FIG. 9, the electronic device 101 (e.g., the processor 120 or the image signal processor 260) may set the playing target frame rate 912 for the first video data 901 and the playing target frame rate 912 for the second video data 902 to be the same predetermined frame rate. At this time, the predetermined frame rate may be equal to the first frame rate. However, without being limited thereto, the predetermined frame rate may be higher than the first frame rate or equal to or lower than the second frame rate. Accordingly, the first video data 901 obtained at the first frame rate may be visually vary more quickly than the second video data 902. In other words, the playing screen 701 of the second video data 902 may be played visually slower than the playing screen 701 of the first video data 901.

As a specific example, as shown in FIG. 9, the playing target frame rate 912 for the first video data 901 and the second video data 902 may be set to the first frame rate. Thus, the electronic device 101 (e.g., the processor 120 or the image signal processor 260) may play the first video data 901 at the first frame rate from the first time point to the second time point, the second video data 902 at the first frame rate from the second time point to the fifth time point, and the first video data 901 at the first frame rate from the fifth time point to the sixth time point. In other words, the electronic device 101 (e.g., the processor 120 or the image signal processor 260) may perform playback, with the time between the image frames constituting the second video data 902, which is relatively longer than the time of obtaining the second video data 902. Accordingly, the playing time of the second video data 902 may be a second time interval longer than the recording time of the second video data 902. In other words, the playing time of the video data 900 may be a third time interval longer than the recording time of the video data 900. The second time interval and the third time interval may be determined by a difference between the second frame rate and the playing target frame rate 912. Specifically, as the difference between the second frame rate and the playing target frame rate 912 increases, the second time interval and the third time interval may increase.

Thus, the electronic device 101 (e.g., the processor 120 or the image signal processor 260) may play the video data 900, with the playing speed of the first video data 901 different from the playing speed of the second video data 902. The playing speed is inversely proportional to the time when all of the image frames of the video data 900 are played. As the time when all of the image frames of the video data 900 shortens, the playing speed may increase. Meanwhile, the playing speed of the video data 900 may be determined according to the difference between the frame rate 911 and the playing target frame rate 912. For example, when the frame rate 911 of the video data 900 is the second frame rate, and the playing target frame rate 912 is the first frame rate, the playing speed of the video data 900 may be determined as "(first frame rate/second frame rate)*n" (when n is a constant). Meanwhile, the playing speed of the second video data 902 may be expressed as a multiple of the playing speed of the first video data 901. For example, the playing speed of the second video data 902 may be determined as "(first frame rate/second frame rate)*playing speed of first video data 901." As a specific example, when the frame rate 911 of the first video data 901 is 30 fps, the frame rate 911 of the second video data 902 is 960 fps, and the playing target frame rate 912 is 30 fps, the playing speed of the second video data 902 may be $1/32$ times the playing speed of the first video data 901. The above-described playing speed of the first video data 901 may be defined as a normal playing speed, and the playing speed of the second video data 902 may be defined as a slow motion playing speed. When the playing speed of the second video data 902 is determined to be $1/32$ times the playing speed of the first video data 901 as described above, the playing speed of the second video data 902 may be defined as a super slow motion playing speed, following a noticeable difference from the playing speed of the first video data 901.

As set forth above, as the playing screen 701 of the second video data 902 is played slower than the playing screen 701 of the first video data 901, the playing screen 701 of the video data 900 which looks dynamic may be provided to the user.

Without being limited in order, operations 601 to 604 may be performed in a different order. For example, although it has been described above that operation 603 is performed earlier than operation 604, operation 604 may be performed later than operation 603 without being limited thereto. Without being limited thereto, more or fewer operations than operations 601 to 604 may be performed.

Although in the above example the first frame rate differs from the second frame rate, the first frame rate and the second frame rate may be determined to be the same frame rate. In this case, the electronic device 101 (e.g., the processor 120 or the image signal processor 260) may set the playing target frame rate of the first video data 901 to be higher than the playing target frame rate of the second video data 902 so that the playing screen 701 of the first video data 901 is visually varied more quickly than the playing screen 701 of the second video data 902. In other words, the electronic device may set the playing target frame rate 912 of the first video data 901 to be higher than the playing target frame rate 911 of the second video data 902 in order to play the playing screen 701 of the second video data 902 slower than the playing screen 701 of the first video data 901. This may contribute to the relationship between the playing speed and the playing target frame rate 912 described above.

Although in the above example the playing target frame rates 912 of the first video data 901 and the second video data 902 are set to correspond to each other, the playing target frame rate 912 of the first video data 901 may be set to be different from the playing target frame rate 912 of the second video data 902. In this case, the playing target frame rate 912 of the first video data 901 may be set to a first playing target frame rate 912, and the playing target frame rate 912 of the second video data 902 may be set to a second playing target frame rate 912. The relationship in level between the frame rates 911 may be set as follows.

First frame rate≤first playing target frame rate 912<second playing target frame rate 912≤second frame rate Thus, the playing screen 701 of the first video data 901 may be visually varied more quickly than the playing screen 701 of the second video data 902. In other words, the playing screen 701 of the second video data 902 may be played slower than the playing screen 701 of the first video data 901.

For ease of description, the playing target frame rate 912 of the first video data 901 and the playing target frame rate 912 of the second video data 902 are assumed to be set to the first frame rate. However, as described above, the playing target frame rate 912 of the first video data 901 and the playing target frame rate 912 of the second video data 902 are not limited to being set to the first frame rate.

Described below is the operation of providing a predetermined interface for editing video data 900 on the electronic device while displaying the playing screen 701 of the video data 900.

Figure 10:
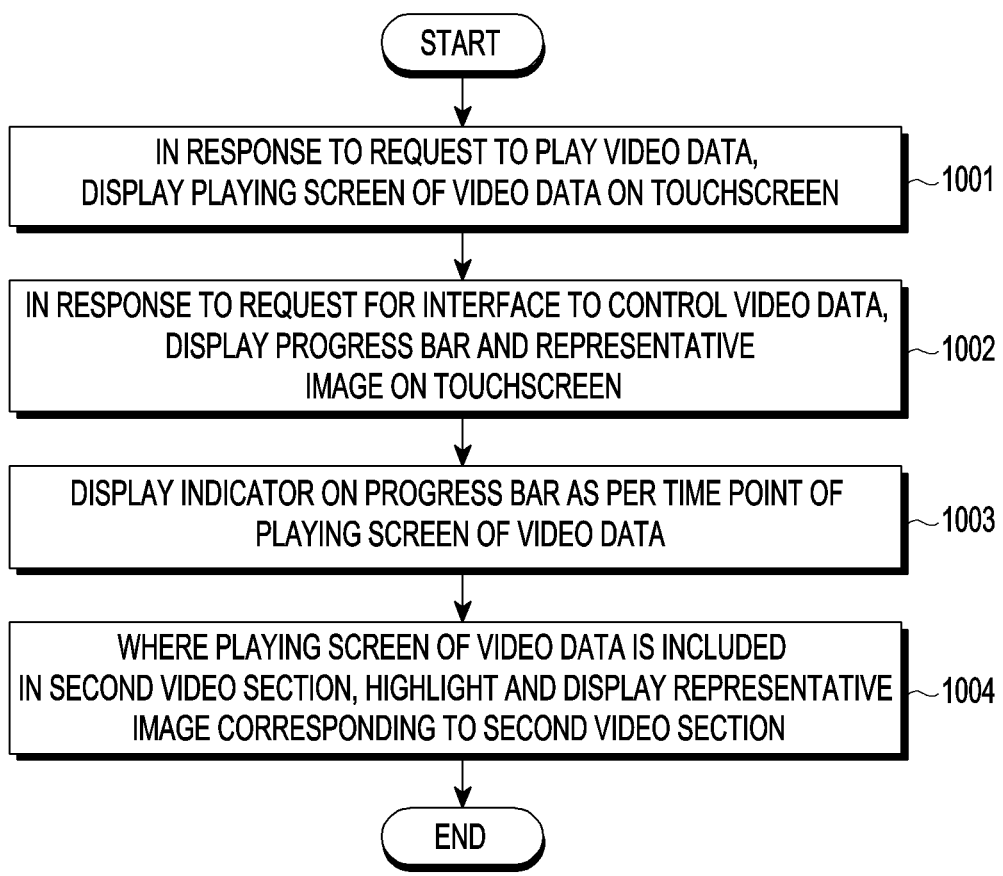
FIG. 10 is a flowchart illustrating a method for providing a predetermined interface for editing video data according to an embodiment of the disclosure.

FIG. 10 is a flowchart a method for providing a predetermined interface for editing video data according to an embodiment of the disclosure.

Figure 11:
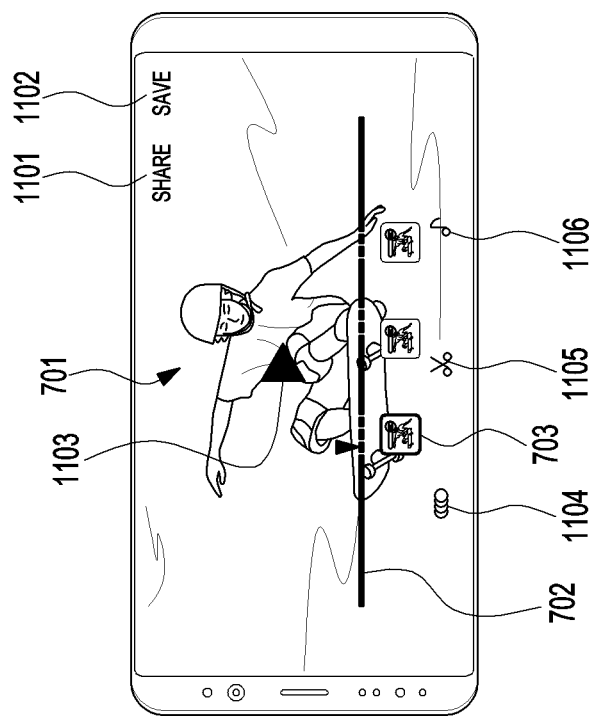
FIG. 11 is a view illustrating a progress bar and representative images displayed on a touchscreen of an electronic device according to an embodiment of the disclosure.
Figure 11:
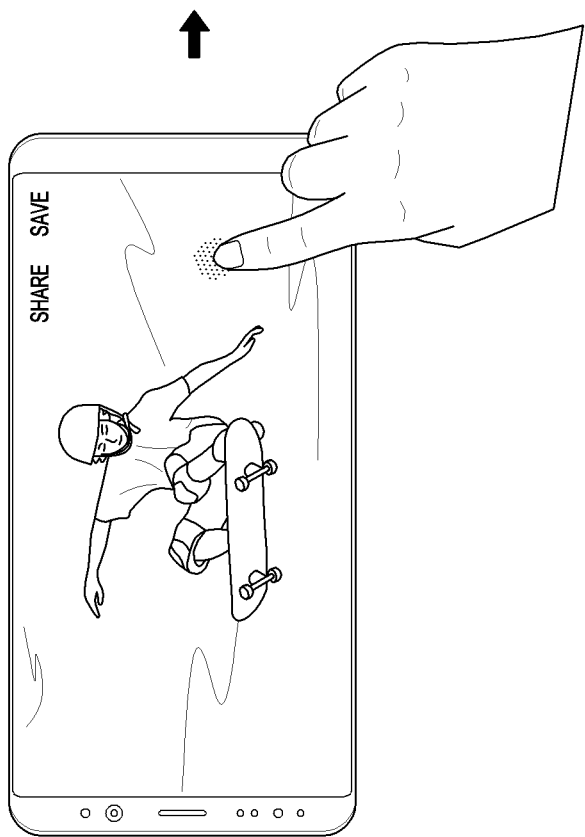

FIG. 11 is a view illustrating a progress bar and representative images displayed on a touchscreen of an electronic device according to an embodiment of the disclosure.

Figure 12:
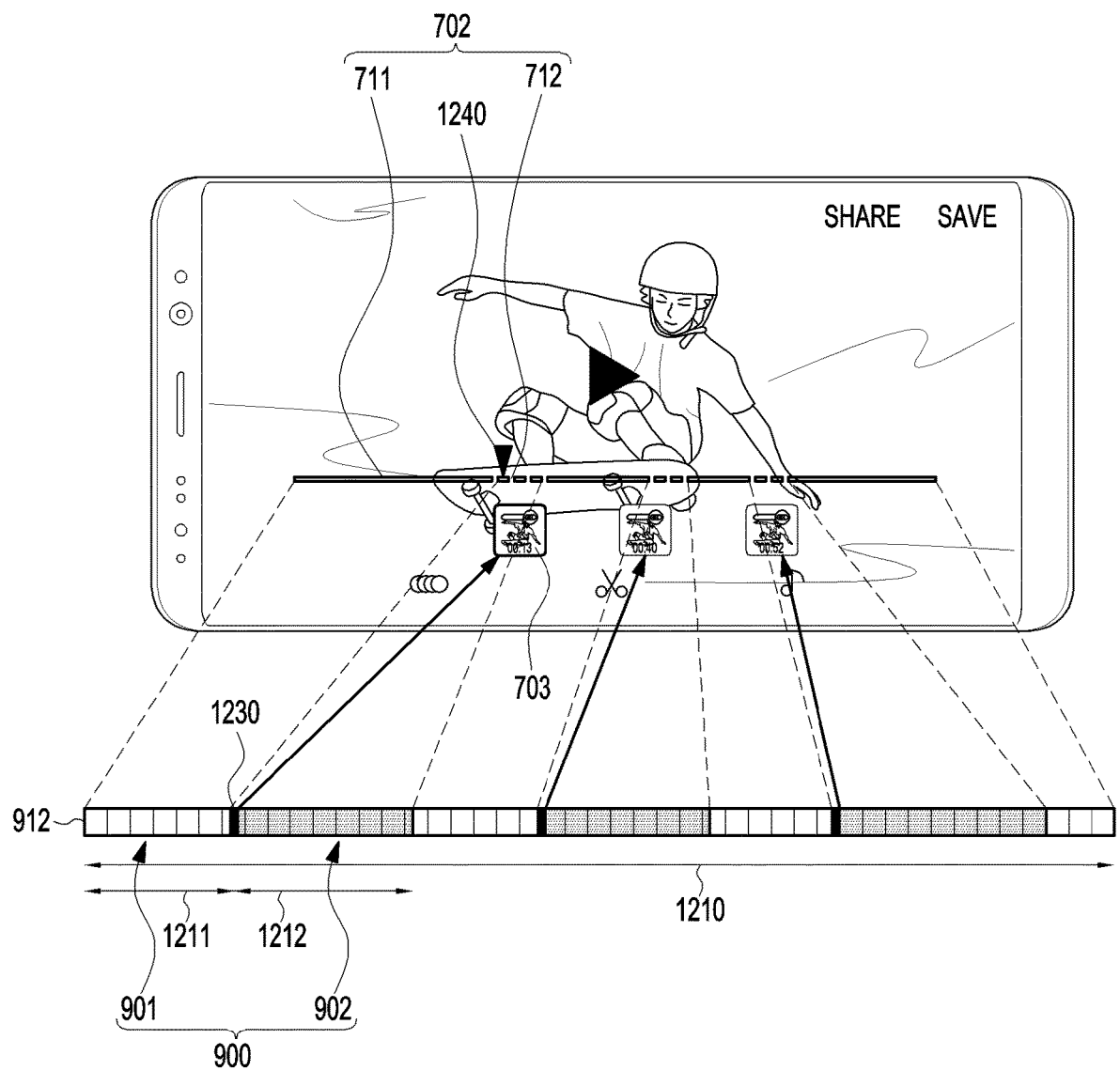
FIG. 12 is a view illustrating a progress bar and representative images displayed on a touchscreen of an electronic device according to an embodiment of the disclosure.

FIG. 12 is a view illustrating a progress bar and representative images displayed on a touchscreen of an electronic device according to an embodiment of the disclosure.

Figure 13:
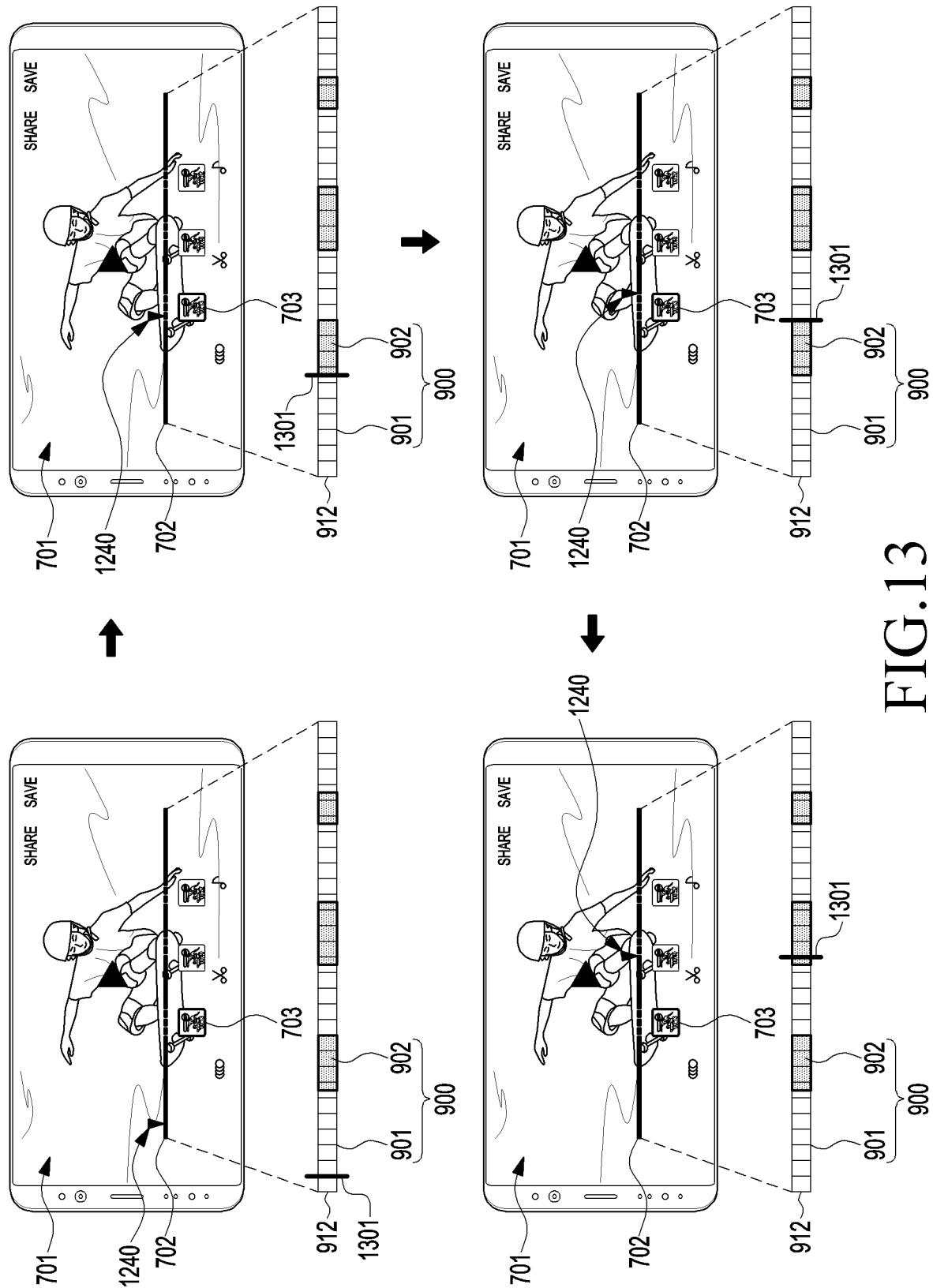
FIG. 13 is a view illustrating representative images and an indicator of a progress bar that changes as video data plays according to an embodiment of the disclosure.

FIG. 13 is a view illustrating representative images and an indicator of a progress bar that changes while video data plays according to an embodiment of the disclosure.

Referring to FIGS. 10, 11, 12, and 13, according to an embodiment, the electronic device 101 (e.g., the processor 120 or the image signal processor 260) may display a predetermined interface for controlling predetermined video data 900 on the touchscreen while displaying a playing screen 701 of the video data 900.

In operation 1001, according to an embodiment, in response to a request for playing the obtained video data 900, the electronic device 101 (e.g., the processor 120 or the image signal processor 260) may display the playing screen 701 of the video data 900 on the touchscreen.

In operation 1002, according to an embodiment, in response to a request for an interface for controlling the video data 900, the electronic device 101 (e.g., the processor 120 or the image signal processor 260) may display an interface for controlling the video data 900 on the touchscreen. The interface for controlling the video data 900 may include at least one or more icons, a progress bar 702, and at least one or more representative images 703.

For example, the request for the interface for controlling the video data 900 may be the electronic device's sensing a touch on a region of the touchscreen displaying the playing screen 701 of the video data 900. As a specific example, the region may be a region of the touchscreen which is positioned adjacent an edge of the electronic device.

For example, the at least one or more icons may include a first icon to a sixth icon as shown in FIG. 11. The first icon 1101 may be for sharing the video data 900 when the playing screen 701 is displayed. The second icon 1102 may be for storing the video data 900 when the playing screen 701 has been edited. The third icon 1103 may be for playing and pausing the video data 900. The fourth icon 1104 may be for requesting to play the video data 900 in super slow mode. The fifth icon 1105 may be for trimming the video data 900. The sixth icon 1106 may be an icon for adding a sound source to the video data 900. In response to a request for the function associated with each icon described above, the electronic device 101 (e.g., the processor 120 or the image signal processor 260) may output a user interface to perform the corresponding function.

The progress bar 702 and the representative image 703 displayed on the touchscreen in operation 1002 are described below in detail.

First, the progress bar 702 is described.

As shown in FIG. 12, according to an embodiment, the progress bar 702 may indicate the full video section of the video data 900. Specifically, the progress bar 702 may indicate the full video section of the video data 900. The full video section of the video data 900 may include a first video section corresponding to at least one or more pieces of first video data 901 and a second video section corresponding to at least one or more pieces of second video data 902.

Specifically, each video section may correspond to the running time 1210 of the video data 900 corresponding thereto. For example, as shown in FIG. 12, the full video section of the video data 900 may correspond to the running time of the video data 900, the first video section 1211 may correspond to the running time of the first video data 901, and the second video section 1212 may correspond to the running time of the second video data 902. In other words, the full video section may correspond to the full time during which the playing screen 701 of the video data 900 is displayed, the first video section may correspond to the time during which the playing screen 701 of the first video data 901 is displayed, and the second video section may correspond to the time during which the playing screen 701 of the second video data 902 is displayed. Meanwhile, the second video section is a portion when the image frames constituting the second video data 902 are played with the time interval therebetween increased and may thus be named a super slow portion.

Meanwhile, the total running time and all the playing time points may be recorded in a region adjacent to the progress bar 702. The full running time may be calculated as the sum of the running time of the first video data and the running time of the second video data. Meanwhile, the running time may be varied depending on determining the playing mode of the second video data, which is described below in detail.

Referring to FIG. 12, according to an embodiment, the electronic device 101 (e.g., the processor 120 or the image signal processor 260) may display the first video section and second video section of the progress bar 702 in different shapes or forms. For example, the electronic device 101 (e.g., the processor 120 or the image signal processor 260) may display the first video section in a solid line and the second video section in a dashed line. Without being limited thereto, the electronic device 101 (e.g., the processor 120 or the image signal processor 260) may display the first video section and the second video section in any other visually different forms or shapes. For example, the electronic device 101 (e.g., the processor 120 or the image signal processor 260) may display the first video section and the second video section in different colors.

As such, displaying the first video section and the second video section may allow the user to use slow motion video in a more convenient way. Since the second video data 902 is visually displayed to the user, the user may be put on notice for the portion when the second video data 902 is played to control the second video data 902, leading to the user's more convenient use of slow motion video.

As shown in FIG. 12, according to an embodiment, the electronic device 101 (e.g., the processor 120 or the image signal processor 260) may display an indicator 1240 to indicate the playing time point 1301 of the video data 900 on the progress bar 702 on the touchscreen.

The representative image 703 is described below.

As shown in FIG. 12, according to an embodiment, the electronic device 101 (e.g., the processor 120 or the image signal processor 260) may display, on the touchscreen, at least some of representative images corresponding to each of at least one or more pieces of second video data 902. The electronic device 101 (e.g., the processor 120 or the image signal processor 260) may produce at least one image 1230 from among the image frames of the second video data as the representative image 703. The electronic device 101 may process or modify the visual data of the selected image frame 1230 to create the representative image. The visual data may include at least one of the size, resolution, and pixel value. In other words, the representative image may be an image created by modifying at least one of the size, resolution, and pixel value of the image frame 1230 included in the second video data. As a specific example, the electronic device 101 (e.g., the processor 120 or the image signal processor 260) may create at least one of the image frames into a thumbnail and display the thumbnail on the touchscreen. In other words, the phrase "the representative image 703 corresponds to the second video data 902" may be interpreted as the second video data being processed. For example, the electronic device 101 (e.g., the processor 120 or the image signal processor 260) may create an image with a different resolution from that of the representative image 703 based on the representative image 703 and display the created image on the touchscreen.

The electronic device 101 may display at least some of representative images 703. The maximum number of representative images 703 that may be displayed on the touchscreen may previously be set on the electronic device. The preset number may be 20, but is not limited thereto. In other words, the electronic device 101 may display all or some of the representative images 703 created on the touchscreen. This may mean that the electronic device may display at least some of representative images 703 on the touchscreen.

Accordingly, even when the playing screen 701 of the video data 900 is the playing screen 701 of the first video data 901, the playing screen 701 of the second video data 902 corresponding to at least some of the representative images 703 may be displayed on the touchscreen through at least some of the representative images 703 displayed on the touchscreen.

Meanwhile, at least some of the representative images 703 displayed on the electronic device may be slid by the user. Thus, at least some of the representative images 703 which may be displayed on the touchscreen but used to be hidden may be slid out and displayed on the touchscreen.

According to an embodiment, the electronic device 101 (e.g., the processor 120 or the image signal processor 260) may display at least some of the representative images 703 near the progress bar 702. For example, as shown in FIG. 12, the electronic device 101 (e.g., the processor 120 or the image signal processor 260) may display at least some of the representative images 703 in a position between the progress bar and an edge of the electronic device.

According to an embodiment, at least some of the representative images 703 displayed on the touchscreen may include a toggle and characters. The playing target frame rate 912 of the second video data 902 corresponding to the representative image 703 may be varied by the toggle, which is described below in detail. The characters may indicate the start time of the second video section corresponding to at least some of the representative images 703.

In operation 1003, according to an embodiment, the electronic device 101 (e.g., the processor 120 or the image signal processor 260) may display the indicator 1240 on the progress bar 702 at the playing time point 1301 of the video data 900. As shown in FIG. 13, corresponding to the playing time point 1301 of the video data 900 varied as the video data 900 is played, the electronic device 101 (e.g., the processor 120 or the image signal processor 260) may move and display the indicator 1240 on the progress bar 702.

In operation 1004, according to an embodiment, when the playing time point 1301 of the video data 900 is included in the second video section, the electronic device 101 (e.g., the processor 120 or the image signal processor 260) may highlight and display at least some of the representative images 703 corresponding to the second video section. For example, as shown in FIG. 13, when the playing screen 701 outputs the second video data 902, the electronic device 101 (e.g., the processor 120 or the image signal processor 260) may differently highlight and border at least some of the representative images 703 corresponding to the second video section from at least others. However, displaying at least some of the representative images 703 in a visually different mode than at least others is not limited to highlighting but may instead adopt other various visual effects. For example, as shown in FIG. 13, at least some of the representative images 703 which have been highlighted may be bordered in a different thickness or color than at least others of the representative images 703.

Without being limited in order, operations 1001 to 1004 may be performed in a different order. Without being limited thereto, more or fewer operations than operations 1001 to 1004 may be performed.

Meanwhile, in response to selecting the progress bar 702 or the representative image 703, the electronic device may alter the highlight of the thumbnail and the position of the indicator 1240 of the progress bar 702 and the playing screen 701 of the video data 900.

Figure 14:
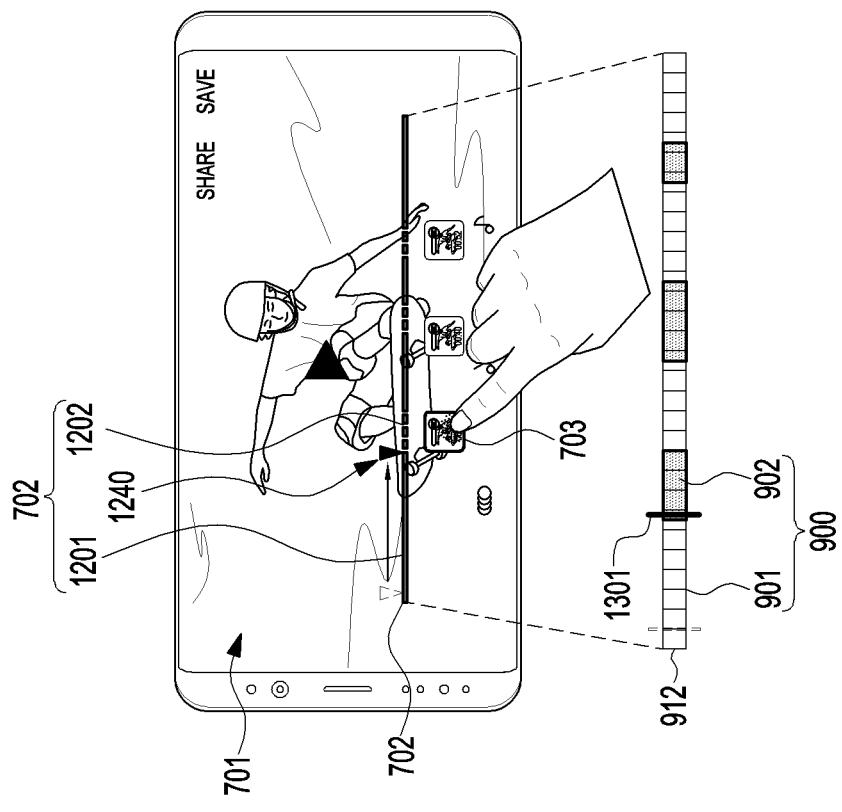
FIG. 14 is a view illustrating an indicator of a progress bar and a video data playing screen that changes when a representative image is touched according to an embodiment of the disclosure.
Figure 14:
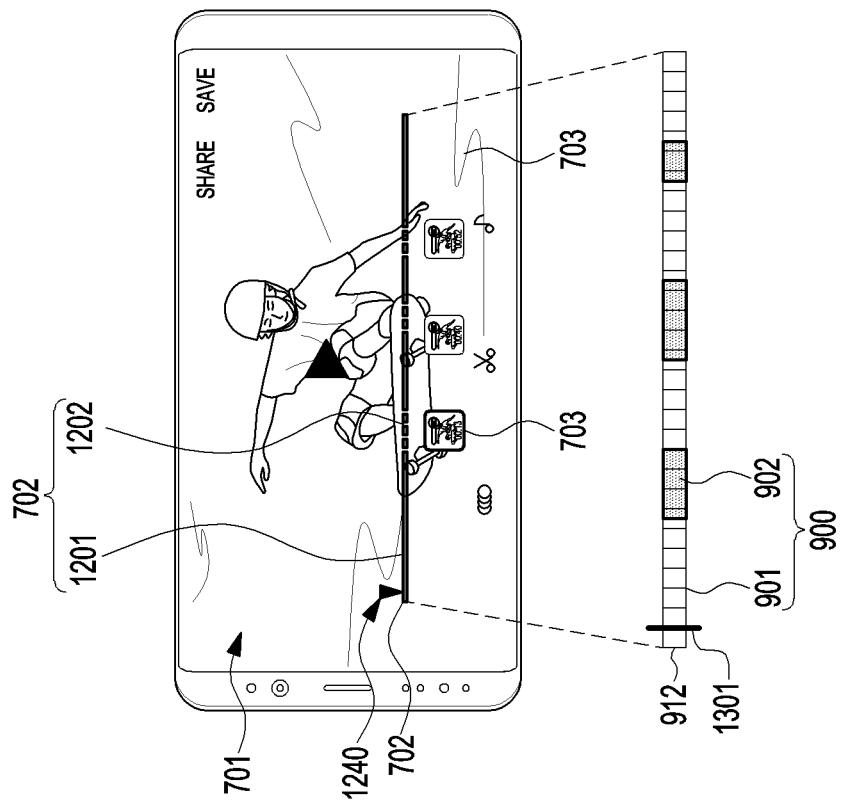

FIG. 14 is a view illustrating an indicator of a progress bar and a playing screen of video data that changes when a representative image is touched according to an embodiment of the disclosure.

Referring to FIG. 14, according to an embodiment, when at least some of the representative images 703 are touched, the playing screen 701 of the second video data 902 may be displayed on the touchscreen, and the indicator 1240 may be displayed on the second video section 1201 corresponding to the at least some of the representative images 703. As an example, the playing screen 701 of the first time point of the second video data 902 may be displayed, and the indicator 1240 may be displayed on the start point of the second video section 1202, which is after the first video section 1201. Accordingly, the user may view the desired super slow video section by touching the representative image.

According to an embodiment, when the second video section is touched, at least some of the representative images 703 corresponding to the touched second video section may be displayed on the touchscreen, and the indicator 1240 may be displayed on the second video section.

As such, as at least some of the representative images 703 are touched, the playing screen 701 corresponding to the touched at least some of the representative images 703 may be displayed, and the indicator 1240 may be displayed, allowing the user more convenience of slow motion video. The user may easily select the second video section through at least some of the representative images 703 and may thus use slow motion video in a more convenient manner.

Controlling a super slow portion through a toggle 1600 included in at least some of the representative images 703 is described below.

Figure 15:
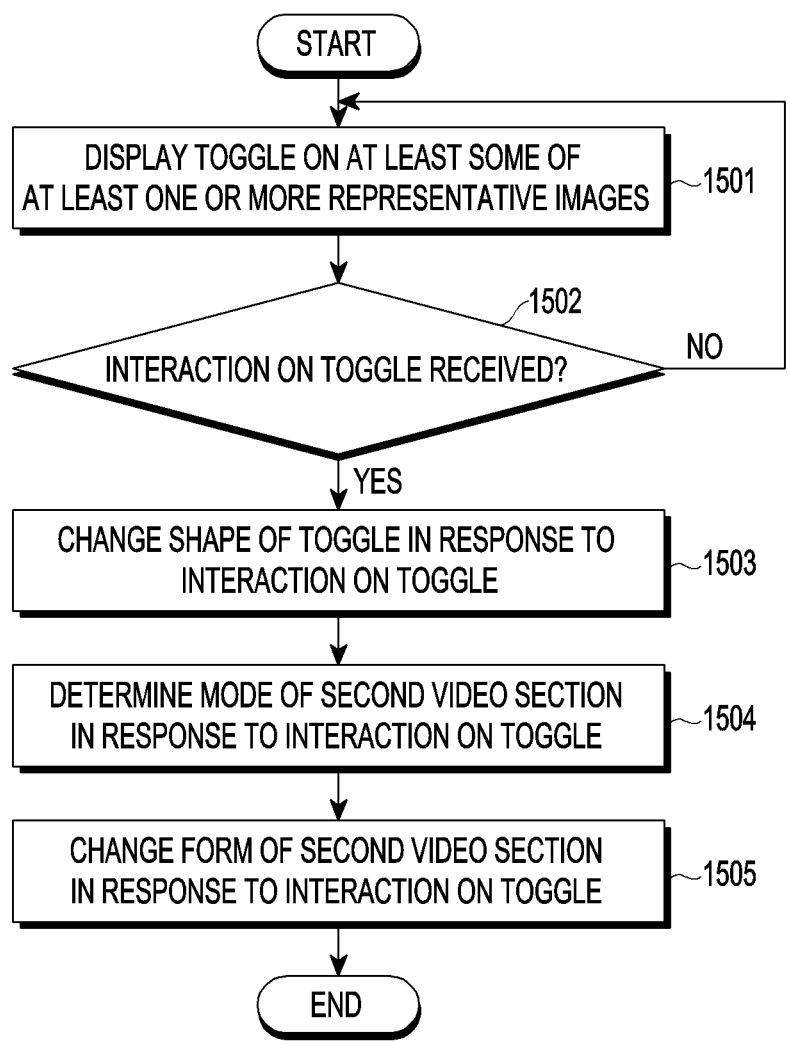
FIG. 15 is a flowchart illustrating sharing and storing a slow motion video according to an embodiment of the disclosure.

FIG. 15 is a flowchart illustrating sharing and storing a slow motion video according to an embodiment of the disclosure.

Figure 16:
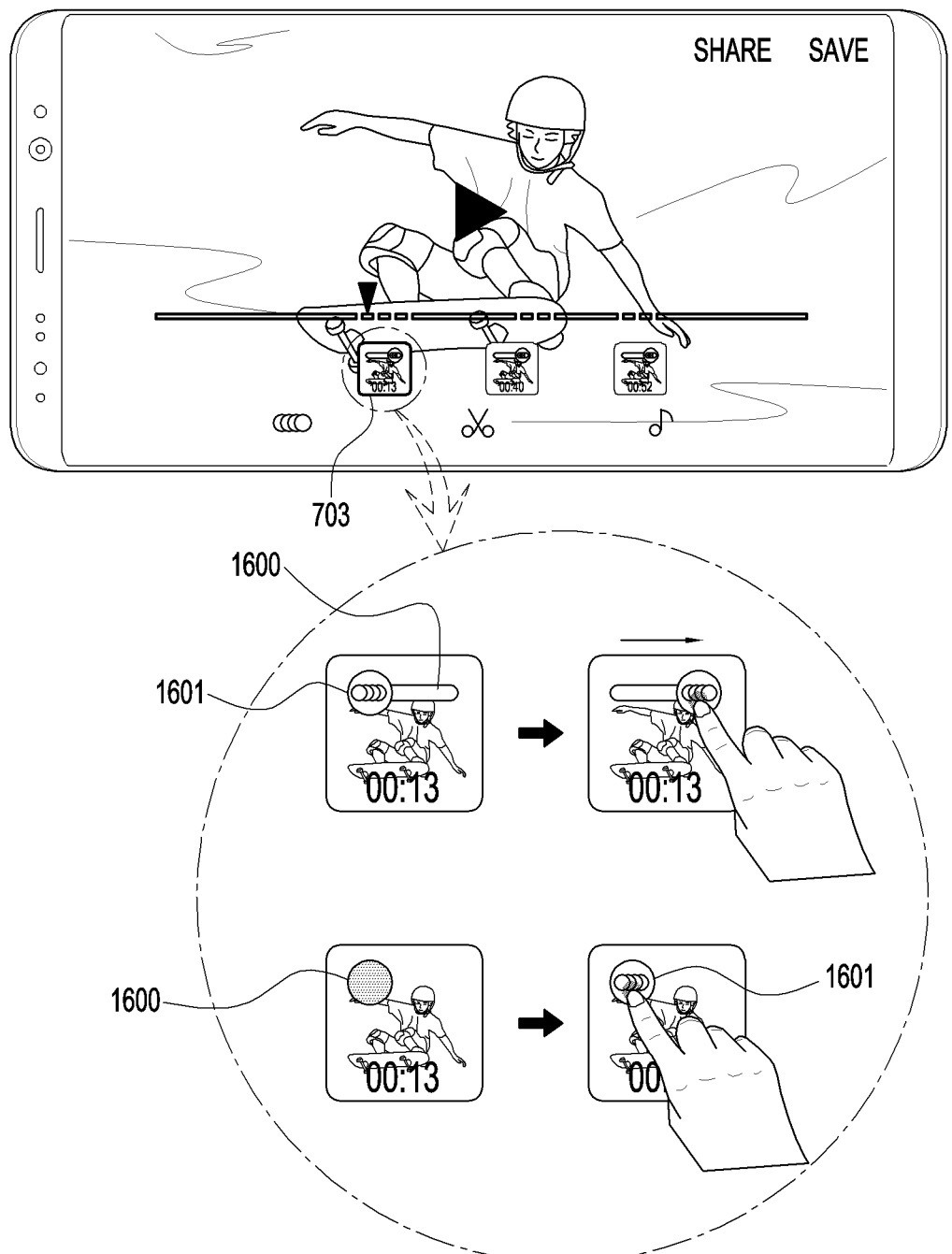
FIGS. 16 and 17 are views illustrating a toggle included in representative images for controlling of a super slow portion according to an embodiment of the disclosure.
Figure 17:
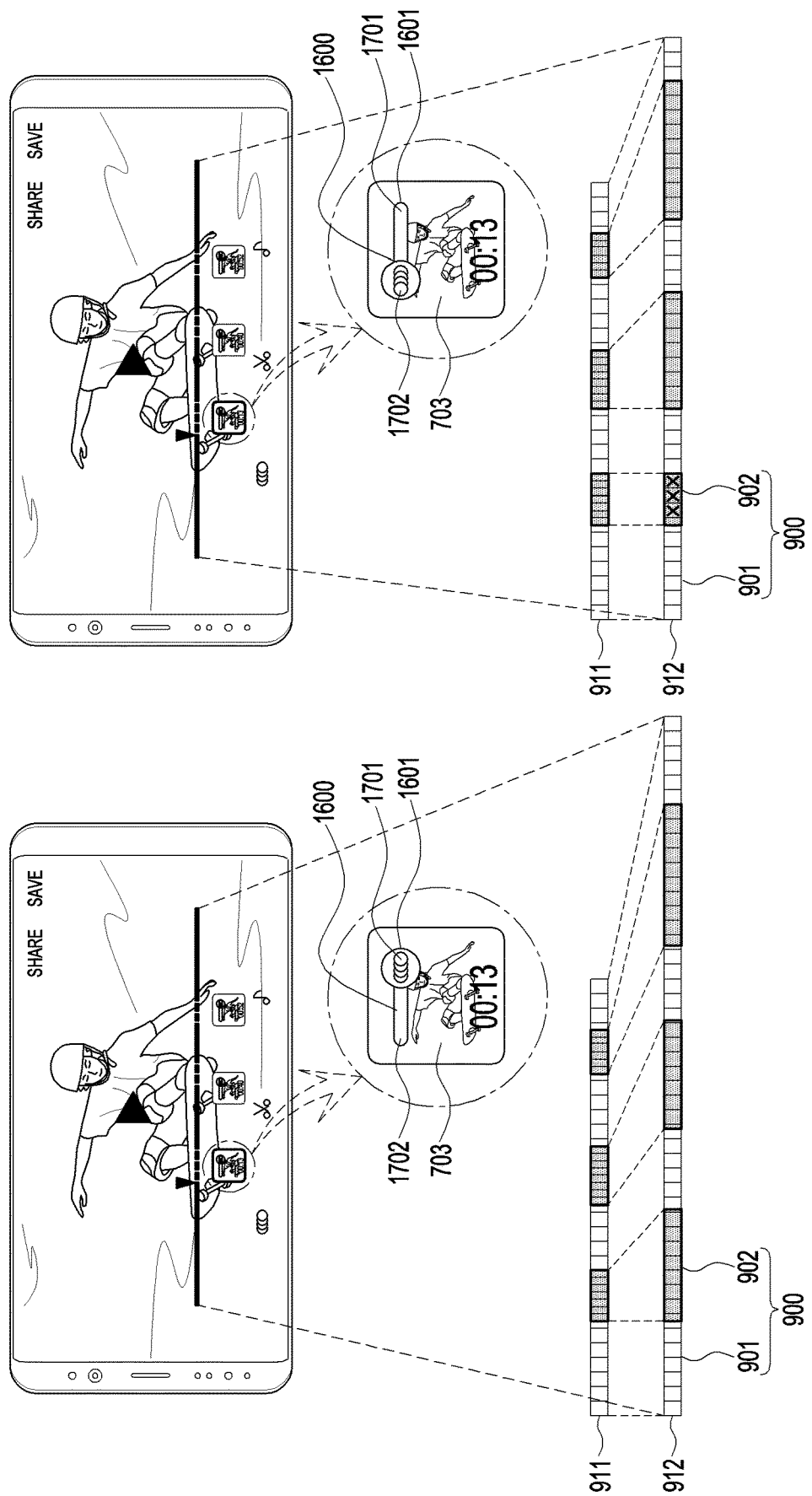

FIGS. 16 and 17 are views illustrating a toggle included in representative images for controlling of a super slow portion according to an embodiment of the disclosure.

Referring to FIGS. 15, 16, and 17, according to an embodiment, the electronic device 101 (e.g., the processor 120 or the image signal processor 260) may determine the playing mode of the second video data 902 in response to a request for switching modes for the second video data 902 through the toggle 1600, which is superimposed over at least some of the representative images 703. The modes may include a normal playing mode and a slow motion playing mode. During the determination of the playing mode, the images frames of the second video data 902 to be played may be determined. In other words, the playing speed of the second video data 902 may be determined based of the mode. This is described below in detail.

In operation 1501, according to an embodiment, the electronic device 101 (e.g., the processor 120 or the image signal processor 260) may display the toggle 1600 over at least some of at least one or more representative images 703. As shown in FIG. 16, the toggle 1600 may include a toggle button 1601. The toggle 1600 may be a toggle including the toggle button 1601 that moves from a first position 1701 to a second position 1702 or from the second position 1702 to the first position 1701, and the toggle 1600 may be defined as a sliding toggle 1600. The toggle 1600 may be a toggle when the toggle button 1601 is displayed or not, and such a toggle 1600 may be defined as a blink toggle 1600.

In operation 1502, according to an embodiment, the electronic device 101 (e.g., the processor 120 or the image signal processor 260) may receive an input on the toggle 1600 displayed on at least some of the representative images 703. In other words, the electronic device 101 (e.g., the processor 120 or the image signal processor 260) may receive an input on the toggle 1600 and obtain a request for switching modes for the second video data 902. As shown in FIG. 16, for example, receiving an input on the toggle 1600 may be sensing a touch on the toggle 1600 or the toggle button 1601.

In operation 1503, according to an embodiment, the electronic device 101 (e.g., the processor 120 or the image signal processor 260) may change the shape of the toggle 1600 in response to the input on the toggle 1600. For example, when the toggle 1600 is implemented as a sliding toggle 1600 as shown in FIG. 16, the electronic device 101 (e.g., the processor 120 or the image signal processor 260) may relocate the toggle button 1601 from the first position 1701 to the second position 1702 or from the second position 1702 to the first position 1701. When the toggle 1600 is implemented as a blink toggle 1600 as shown in FIG. 16, the electronic device 101 (e.g., the processor 120 or the image signal processor 260) may display or hide the toggle button 1601.

In operation 1504, according to an embodiment, the electronic device 101 (e.g., the processor 120 or the image signal processor 260) may determine the playing mode of the second video data 902 in response to the input on the toggle 1600. In other words, the electronic device 101 (e.g., the processor 120 or the image signal processor 260) may determine the mode of the second video data 902 in response to the shape change in the toggle 1600. For example, as shown in FIG. 17, when the toggle 1600 is implemented as a sliding toggle 1600, the mode of the second video data 902 may be determined to be a normal playing mode if the toggle button 1601 is in the first position 1701 and a slow motion playing mode if the toggle button 1601 is in the second position 1702. When the toggle 1600 is implemented as a blink toggle 1600, the mode of the second video data 902 may be determined to be a normal playing mode if the toggle button 1601 is displayed and a slow motion playing mode if the toggle button 1601 is not displayed. Without being limited thereto, determining the mode corresponding to the shape of the toggle 1600 may be performed in the opposite way. For example, the mode of the second video data 902 may be determined to be the slow motion playing mode if the toggle button 1601 is in the first position 1701 and the normal playing mode if the toggle button 1601 is in the second position 1702.

Playing the second video data 902 at the second video data 902 is described below in detail.

When the second video data 902 is determined to be played in the normal playing mode, the playing speed of the second video data 902 may be determined to be equal to the playing speed of the first video data 901. In other words, the playing speed of the second video data 902 may be determined to be the normal playing speed. To that end, the electronic device 101 (e.g., the processor 120 or the image signal processor 260) may play only some of the image frames of the second video data 902 at the playing target frame rate 912 of the first video data 901 as shown in FIG. 17. Specifically, the electronic device 101 (e.g., the processor 120 or the image signal processor 260) may play some of the plurality of image frames of the second video data 902 but not the rest. More specifically, the electronic device 101 may play only some of all the image frames of the second video data 902 to play the second video data 902 during the same time of obtaining the second video data 902. Thus, the second video data 902 may be played in the normal playing mode, not in the slow motion mode. According to an embodiment, the image frames of the second video data 902 to be played may be determined to have the same time interval. As set forth above, the playing target frame rate 912 of the first video data 901 may be determined to be the first frame rate which may be, e.g., 30 fps.

Without being limited thereto, the electronic device 101 (e.g., the processor 120 or the image signal processor 260) may play the second video data 902 visually at the same speed as the first video data 901 by determining the playing target frame rate 912 at the second frame rate at which the second video data 902 is obtained.

When the mode of the second video data 902 is determined to be the slow motion mode, the playing speed of the second video data 902 may be determined to be slower than the playing speed of the first video data 901 of the first video section. In other words, when the second video data 902 is determined to be played in the slow motion mode, the playing speed of the second video data 902 may be determined to be the slow motion playing speed. To that end, as described above, the electronic device 101 (e.g., the processor 120 or the image signal processor 260) may play the second video data 902 at the playing target frame rate 912 corresponding to the playing target frame rate 912 of the first video data 901. In other words, the electronic device 101 (e.g., the processor 120 or the image signal processor 260) may make the time interval between the image frames constituting the second video data 902 long enough to correspond to the playing target frame rate 912 of the first video data 901 and play the second video data 902. As set forth above, the playing target frame rate 912 of the first video data 901 may be determined to be the first frame rate. The first frame rate may be, e.g., 30 fps. However, as set forth above, the first frame rate, the second frame rate, the playing target frame rate 912 of the first video data 901, and the playing target frame rate 912 of the second video data 902 may be set to various values.

Meanwhile, the toggle 1600 displayed on the touchscreen may be set in shape. For example, the shape of the toggle 1600 first displayed on the touchscreen may be preset based on the mode of the second video data 902. Specifically, since the mode of the second video data 902 is preset as the slow motion playing mode upon producing the video data, the shape of the toggle 1600 may be preset accordingly. For example, when the toggle 1600 is implemented as a sliding toggle 1600, the toggle button 1601 first displayed on the touchscreen may be in the first position 1701. When the toggle 1600 is implemented as a blink toggle 1600, the toggle button 1601 of the toggle 1600 may be already on display. Without being limited thereto, when the mode of the second video data 902 is preset to the normal playing mode, the toggle button of the sliding toggle may be preset to be in the second position 1702, and the button of the blink toggle may be preset not to be displayed.

In operation 1505, in response to the mode switch for the second video data 902, the electronic device 101 (e.g., the processor 120 or the image signal processor 260) may change the shape of the second video section according to an embodiment. For example, when the second video data 902 is set to have the normal playing mode, the electronic device 101 (e.g., the processor 120 or the image signal processor 260) may display the second video section on the progress bar in the same shape as the first video section. For example, the electronic device 101 (e.g., the processor 120 or the image signal processor 260) may display the second video section in the same shape, e.g., solid line, as the first video section. Without being limited thereto, the electronic device 101 (e.g., the processor 120 or the image signal processor 260) may change the shape of the second video section on the progress bar to differ from the first video section. When the second video data is set to have the slow motion mode, the electronic device may display the second video section in a different shape from the first video section. For example, as set forth above, the electronic device may display the second video section on the progress bar in a different shape, e.g., dotted line, from the first video section.

Meanwhile, during the determination of the playing mode of the second video data 902, the running time of the video data 900 displayed on a region adjacent the progress bar 702 may be varied. For example, when the second video data 902 of the video data 900, which is selected to be played in the normal mode, increases, the running time of the video data displayed on the region adjacent the progress bar may be indicated to be shorter, and when the second video data 902 of the video data 900, which is selected to be played in the slow motion playing mode, increases, it may be indicated as a longer running time than the recording time of the video data 900.

By the above-described operation, the video data 900 in which the running time of the second video data 902 has been determined, may be stored or shared by an icon that provides the storing or sharing function as described above. During the determination of the playing mode of the second video data 902 as described above, the running time of the video data stored may be determined. For example, when the second video data 902 of the video data 900, which is selected to be played in the normal mode, increases, it may have a running time similar to the recording time of the video data 900, and when the second video data 902 of the video data 900, which is selected to be played in the slow motion playing mode, increases, it may have a longer running time than the recording time of the video data 900.

As set forth above, the playing speed of the second video data 902 of the video data 900 may be controlled through the toggle 1600 formed over at least some of the representative images 703, allowing the user to easily edit slow motion video. The toggle 1600 enables editing of slow motion video without the need for controlling the electronic device, allowing the user to easily edit slow motion video.

Without being limited in order, operations 1501 to 1505 may be performed in a different order. For example, although it has been described above that operation 1504 is performed earlier than operation 1505, operation 1505 may be performed later than operation 1504 without being limited thereto. Without being limited thereto, more or fewer operations than operations 1501 to 1505 may be performed. For example, according to an embodiment, operation 1505 may be skipped.

Adding effects to the second video data 902 through at least some of the representative images 703 is described below.

Figure 18:
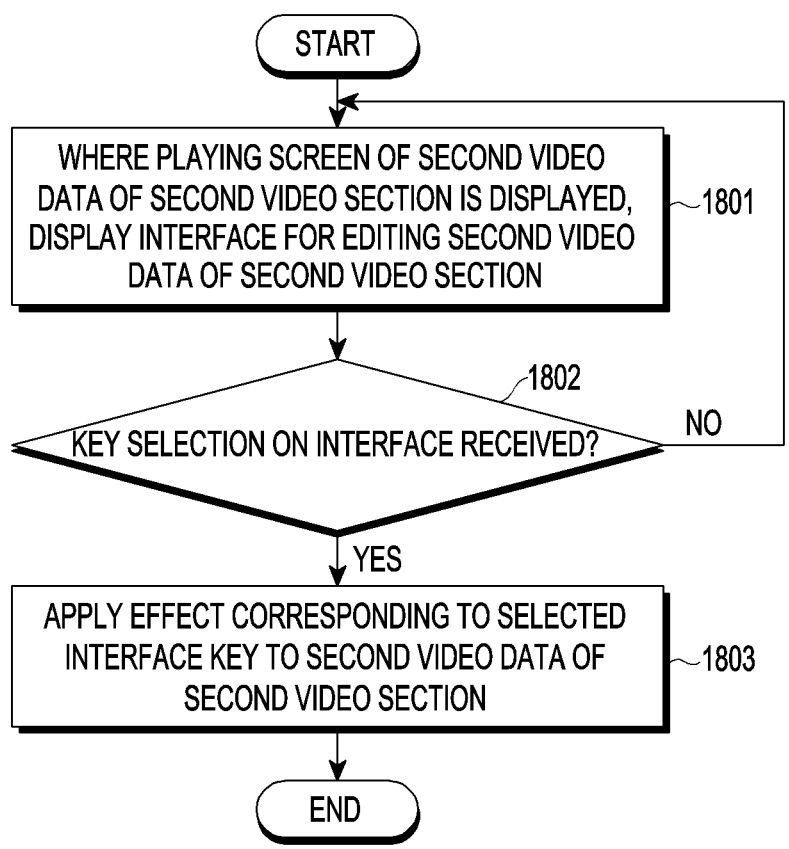
FIG. 18 is a flowchart illustrating an example of adding an effect to video data through representative images according to an embodiment of the disclosure.

FIG. 18 is a flowchart illustrating an example of adding an effect to second video data through representative images according to an embodiment of the disclosure.

Figure 19:
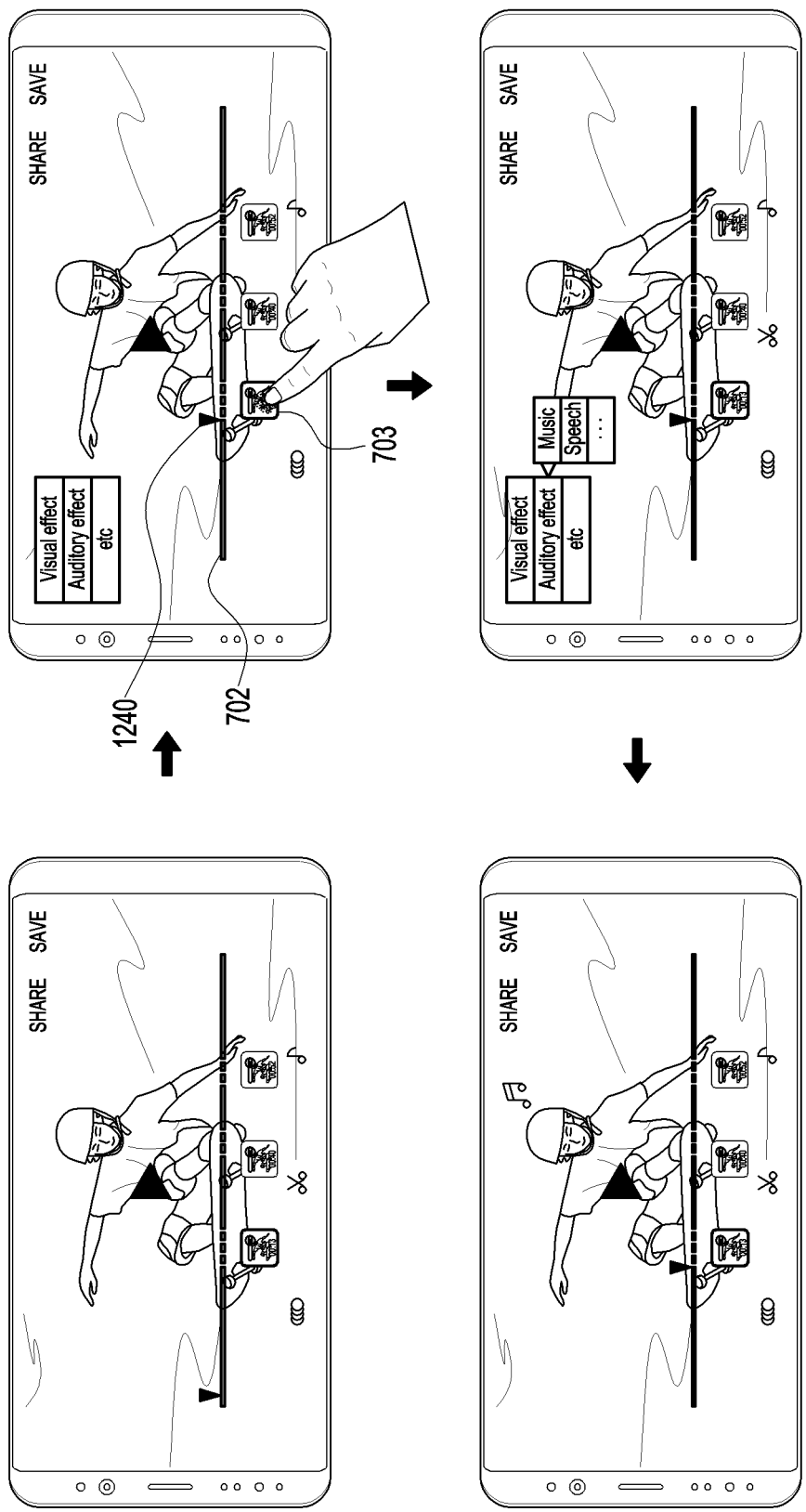
FIGS. 19 and 20 are views illustrating an example of providing an interface to add an effect to video data through representative images according to an embodiment of the disclosure.
Figure 20:
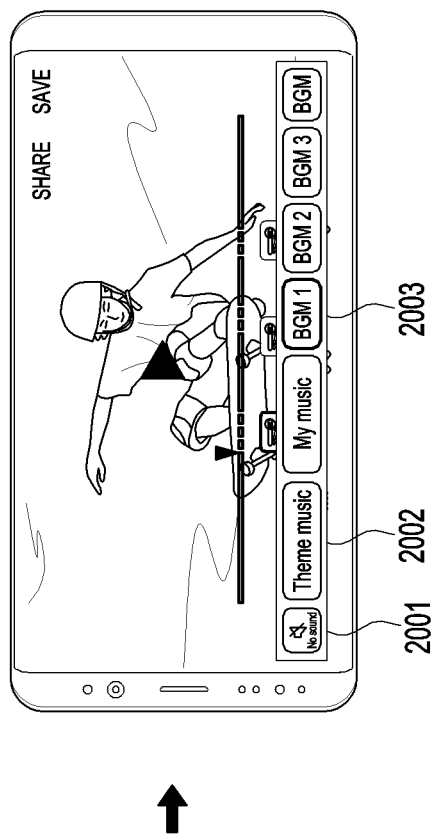
Figure 20:
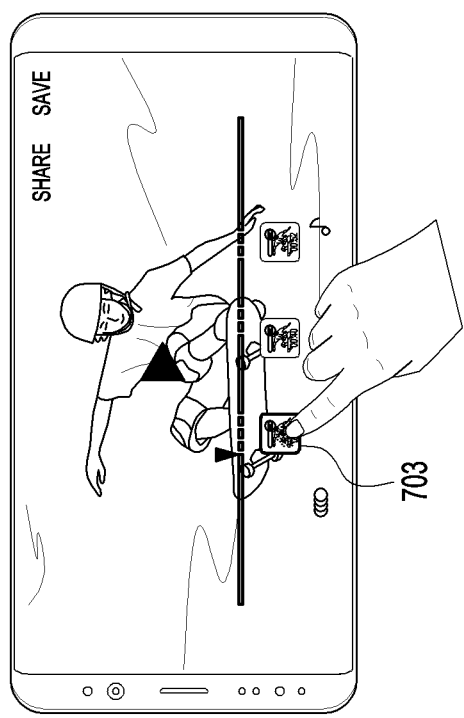

FIGS. 19 and 20 are views illustrating an example of providing an interface for adding an effect to video data through representative images according to an embodiment.

Referring to FIGS. 18, 19, and 20, according to an embodiment, when the playing screen 701 of the second video data 902 is displayed, the electronic device 101 (e.g., the processor 120 or the image signal processor 260) may display a predetermined interface for adding a predetermined effect to the second video data 902 corresponding to at least some of the representative images 703 on the touchscreen.

In operation 1801, according to an embodiment, when the playing screen 701 of the second video data 902 is displayed, the electronic device may display an interface for editing the second video data 902. In other words, when the playing time point 1301 of the video data 900 is included in the second video section, the electronic device 101 (e.g., the processor 120 or the image signal processor 260) may display an interface for editing the second video data 902. As shown in FIG. 19, the playing screen 701 of the second video data 902 may be responsive to a touch on at least some of the representative images 703 corresponding to the second video section. Without being limited thereto, the playing screen 701 of the second video data 902 may be one responsive to a touch on the second video section.

According to an embodiment, the electronic device 101 (e.g., the processor 120 or the image signal processor 260) may provide a visual or auditory editing effect of the second video data 902 as a predetermined effect that may be assigned to the second video data 902. In other words, the interface for editing the second video data 902 may provide a visual editing function and an aural editing function. The visual editing function may include the functions of zooming, color changing, or adding images. For example, when the zooming function is selected, the second video data 902 may be processed so that its ROI is zoomed in, and the playing screen 701 of the second video data 902 with the zoomed-in ROI may be displayed. The aural editing function may include the functions of muting and adding sound sources.

The interface may be implemented in various forms. As shown in FIG. 19, the interface may be implemented with a key for selecting at least one of a visual effect and an aural effect that is displayed on the touchscreen, and when selected, allows various effects related to the effect to be assigned to the second video data 902. As shown in FIG. 20, the interface may be implemented with only keys for providing aural effects on the touchscreen. In this case, the interface may include a first key to a third key. The first key 2001 may provide the muting function. For example, when the first key 2001 is selected, the second video data 902 may be muted. The second key 2002 may provide the function of adding a predetermined sound source. The sound source may previously be stored in the electronic device or may be received from another electronic device connected with the electronic device via communication. When the second key 2002 is selected, and a sound source to be added to the second video data 902 is selected, the sound source may be added. The third key 2003 may provide the function of adding a sound source previously provided on the interface. When the third key 2003 is selected, the sound source previously provided may be added to the second video data 902.

In operation 1802, according to an embodiment, the electronic device 101 (e.g., the processor 120 or the image signal processor 260) may receive a selection of the key provided through the interface.

In operation 1803, according to an embodiment, the electronic device 101 (e.g., the processor 120 or the image signal processor 260) may add the effect provided by the selected key to the second video data 902.

By the above-described operation, the effect-added video data 900 may be stored or shared by an icon that provides the storing or sharing function as described above.

Without being limited in order, operations 1801 to 1803 may be performed in a different order. Without being limited thereto, more or fewer operations than operations 1801 to 1803 may be performed.

An operation for trimming a slow motion video is described below according to an embodiment.

Figure 21:
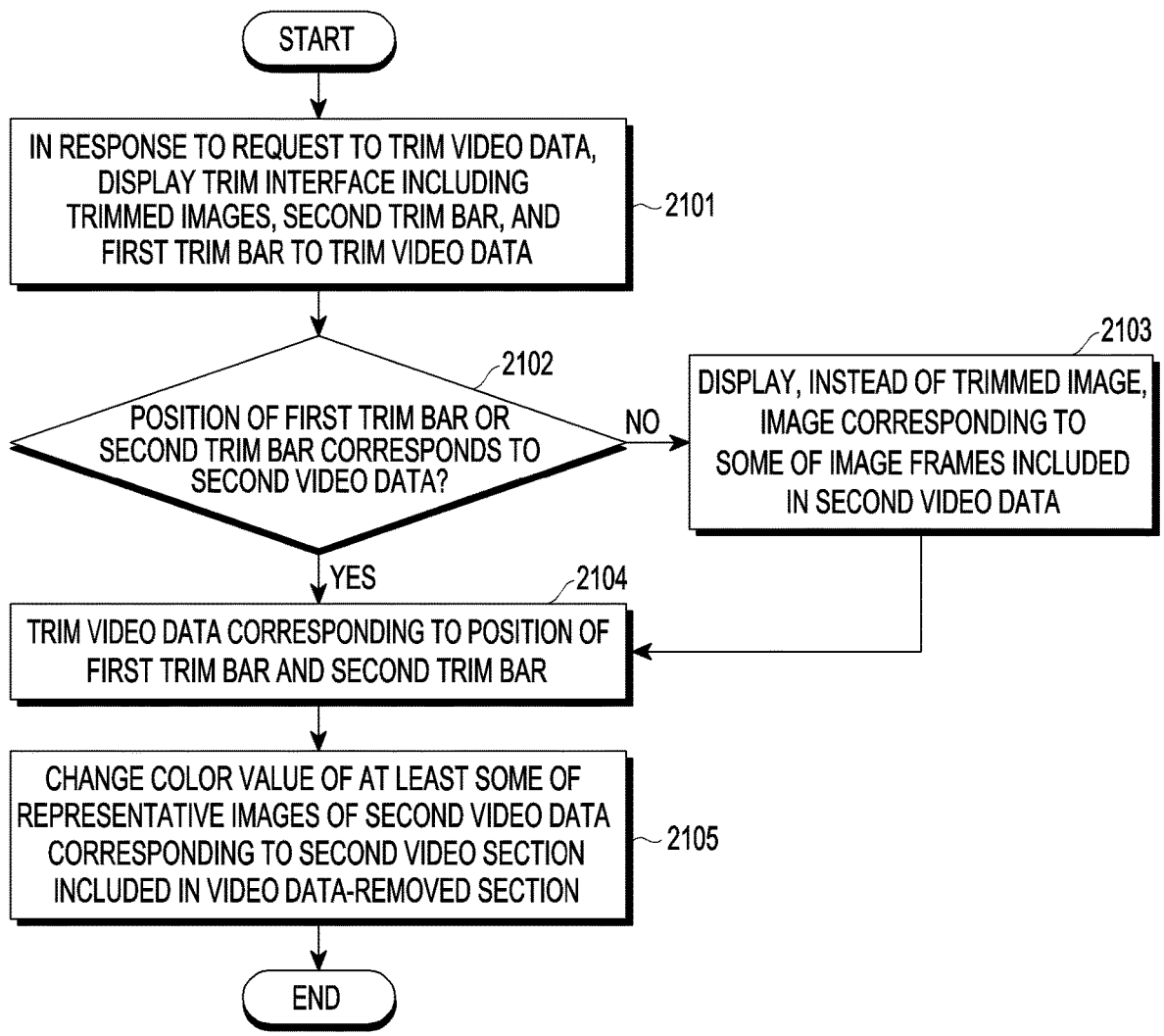
FIG. 21 is a flowchart illustrating an operation for trimming a slow motion video according to an embodiment of the disclosure.

FIG. 21 is a flowchart illustrating an operation for trimming a slow motion video according to an embodiment of the disclosure.

Figure 22:
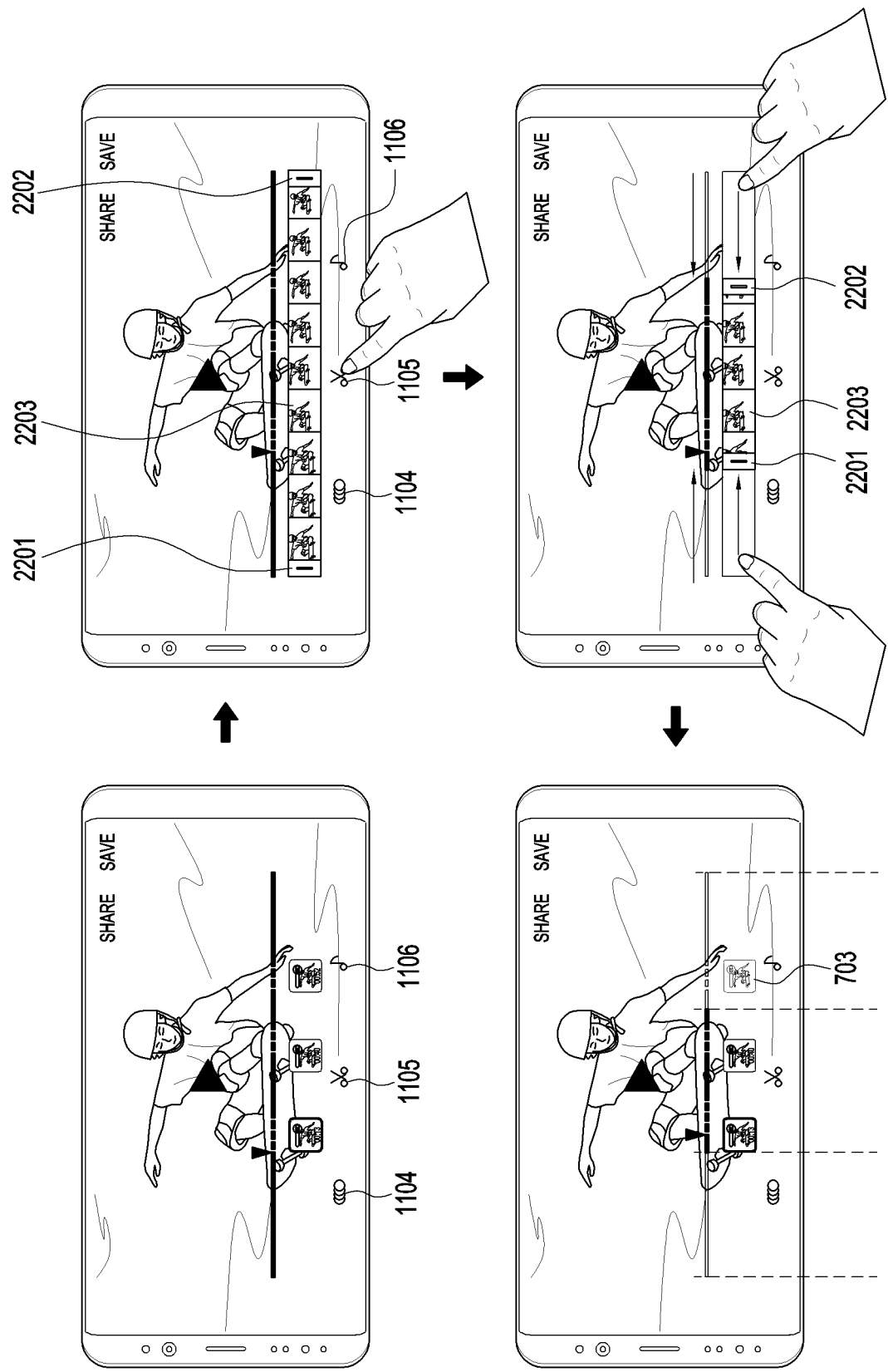
FIGS. 22 and 23 are views illustrating an operation for trimming a slow motion video according to an embodiment of the disclosure.
Figure 23:
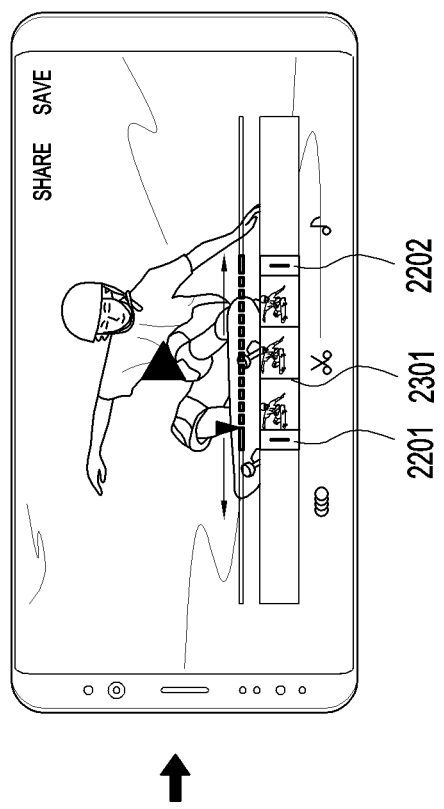
Figure 23:
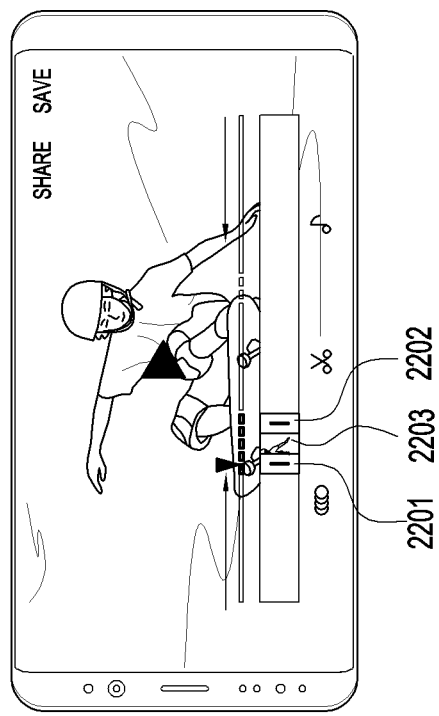

FIGS. 22 and 23 are views illustrating an operation for trimming a slow motion video according to an embodiment of the disclosure.

Referring to FIGS. 21, 22, and 23, according to an embodiment, the electronic device 101 (e.g., the processor 120 or the image signal processor 260) may perform the operation of trimming the video data 900. Trimming may be defined as extracting partial video data 900 from the video data 900 and obtaining trimmed video data 900 by removing the rest of the video data 900 except for the partial video data 900. In turn, the trimmed video data 900 may include the partial video data 900 of the video data 900.

In operation 2101, according to an embodiment, the electronic device 101 (e.g., the processor 120 or the image signal processor 260) may display an interface for video trimming in response to a request for trimming the video data 900. As shown in FIG. 22, the electronic device 101 (e.g., the processor 120 or the image signal processor 260) may detect a touch on the fourth icon, and in response to the touch, display a trim interface for editing the video data 900 on the touchscreen.

Referring to FIG. 22, the trim interface may include a first trim bar 2201, a second trim bar 2202, and trimmed images 2203 displayed between the first trim bar 2201 and the second trim bar 2202. The first trim bar 2201 and the second trim bar 2202 may move on the trimmed images 2203. The portion of the image data trimmed may be determined based on the position of the first trim bar 2201 and the second trim bar 2202. The trimmed images 2203 may be images corresponding to at least some of the plurality of image frames included in the video data 900. In other words, the trimmed images 2203 may be images selected from the video data 900, which allow the user to visually recognize the images of the video data 900. The region where the trimmed images 2203 are displayed may be displayed corresponding to the length of the progress bar 702. The points of the region where the trimmed images 2203 are displayed may correspond to the video section of the progress bar 702.

In operation 2102, according to an embodiment, the electronic device 101 (e.g., the processor 120 or the image signal processor 260) may identify the first trim bar 2201 and the second trim bar 2202 in response to controlling on at least one position of the first trim bar 2201 and the second trim bar 2202. The control of the position of the first trim bar 2201 and the second trim bar 2202 may be performed based on the user's touch on the first trim bar 2201 and the second trim bar 2202 as shown in FIG. 22. Specifically, when the first trim bar 2201 touched by the user is dragged to a predetermined position, the first trim bar 2201 may be moved to the position dragged.

In operation 2103, according to an embodiment, when the position of the first trim bar 2201 or the second trim bar 2202 corresponds to the second video data 902, the electronic device 101 (e.g., the processor 120 or the image signal processor 260) may display an image 2301 corresponding to some of the plurality of image frames included in the second video data 902 instead of the trimmed image 2203.

Referring to FIG. 23, at least one of the first trim bar 2201 and the second trim bar 2202 may be positioned corresponding to the second video data 902 under the control of the position. Specifically, at least one of the first trim bar 2201 and the second trim bar 2202 may be positioned on the trimmed images 2203 corresponding to the second video section.

In this case, the electronic device 101 (e.g., the processor 120 or the image signal processor 260) may lengthen the second video section while shortening the other video sections and may display the images 2301 constituting the second video data 902, instead of the trimmed image 2203, based on at least some of the image frames constituting the second video data 902. Accordingly, the trim bars may be positioned on the images 2301 displayed instead of the trimmed image 2203, and the second video section trimmed may be controlled more accurately.

In operation 2104, according to an embodiment, the electronic device 101 (e.g., the processor 120 or the image signal processor 260) may trim the video data 900 corresponding to the position of the first trim bar 2201 and the second trim bar 2202. As shown in FIG. 22, the electronic device 101 (e.g., the processor 120 or the image signal processor 260) may trim the video data 900 by extracting the video section of the video data 900 corresponding to a portion between the first trim bar 2201 and the second trim bar 2202 or excluding the video data 900 other than the video section. In other words, the video data 900 between the position of the first trim bar 2201 and the second trim bar 2202 may be extracted.

In operation 2105, according to an embodiment, the electronic device 101 (e.g., the processor 120 or the image signal processor 260) may modify the color value of at least some of the representative images 703 of the second video data 902 corresponding to the second video section included in portions from which the video data 900 has been removed. Referring to FIG. 22, the electronic device may reduce the brightness of at least some of the representative images 703 or display them in black and white.

By the above-described operation, the trimmed video data 900 may be stored or shared by an icon that provides the storing or sharing function as described above.

Without being limited in order, operations 2101 to 2105 may be performed in a different order. Without being limited thereto, more or fewer operations than operations 2101 to 2105 may be performed. For example, operations 2102 and 2103 may be omitted.

Operations for sharing and storing a slow motion video are described below according to an embodiment.

Figure 24:
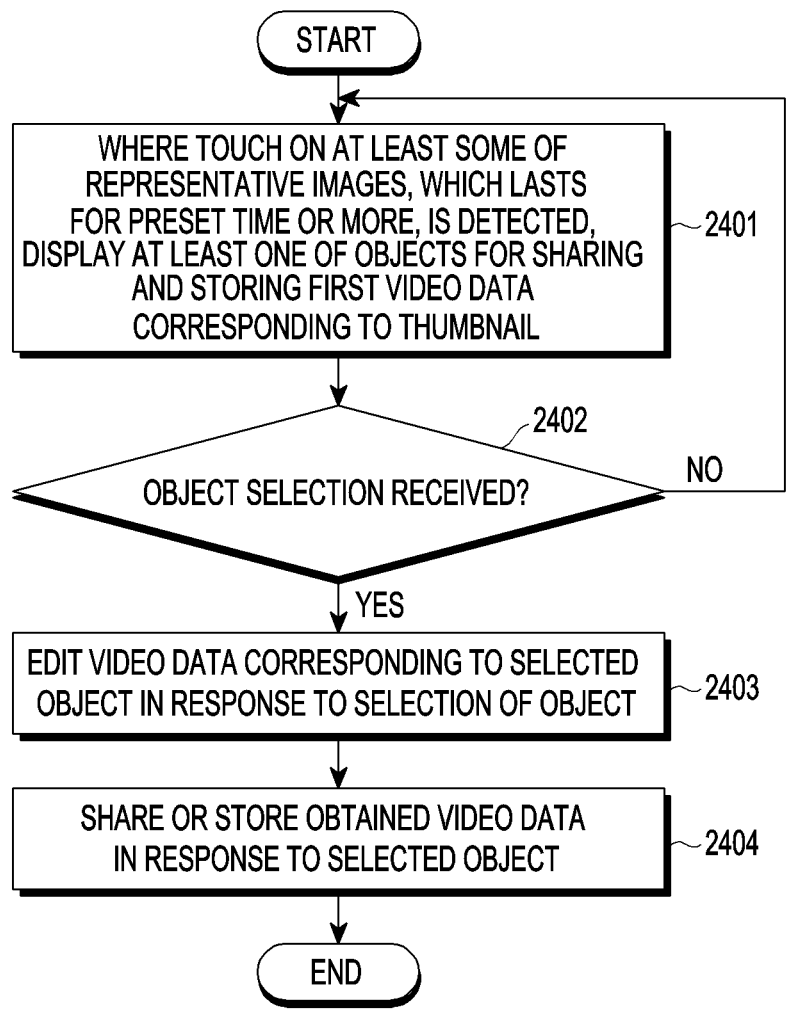
FIG. 24 is a flowchart illustrating operations of sharing and storing a slow motion video according to an embodiment of the disclosure.

FIG. 24 is a flowchart illustrating operations of sharing and storing a slow motion video according to an embodiment of the disclosure.

Figure 25:
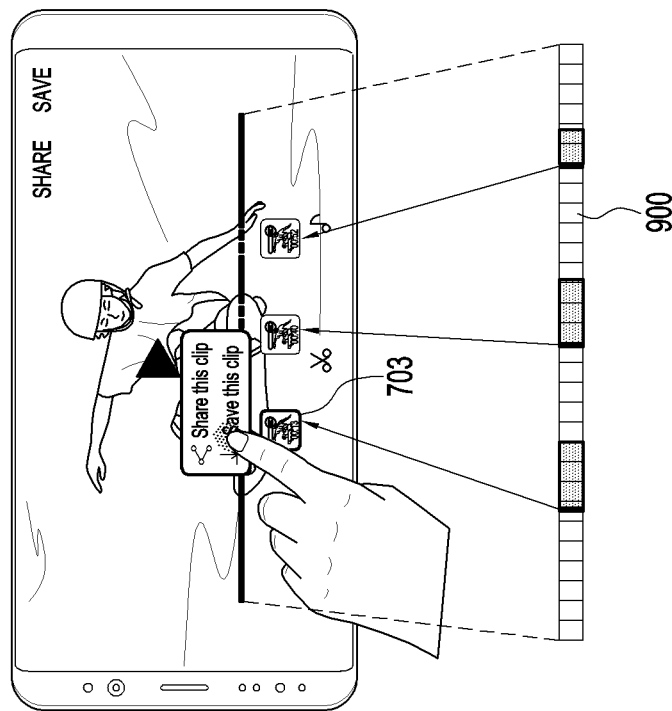
FIG. 25 is a view illustrating operations of sharing and storing a slow motion video according to an embodiment of the disclosure.
Figure 25:
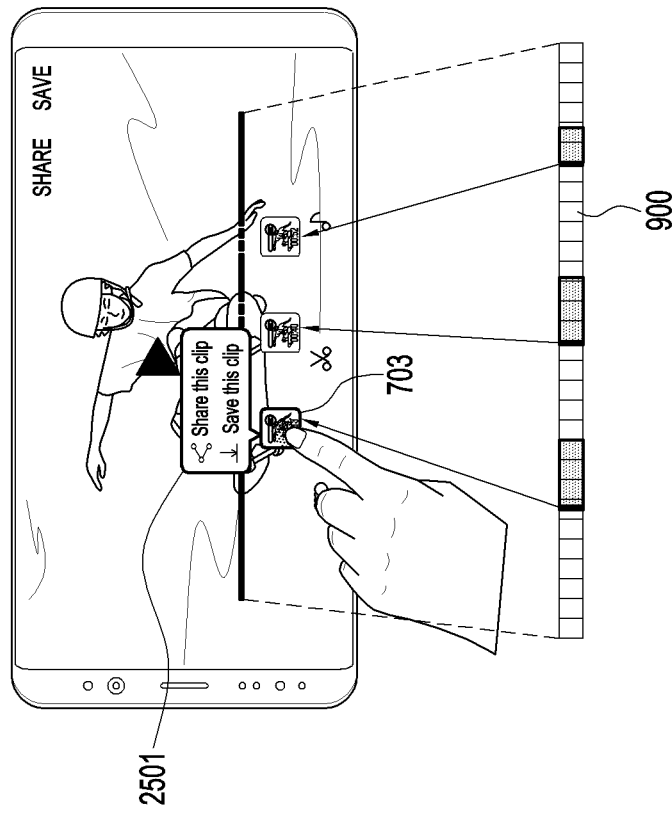

FIG. 25 is a view illustrating operations of sharing and storing a slow motion video according to an embodiment of the disclosure.

Referring to FIGS. 24 and 25, according to an embodiment, the electronic device 101 (e.g., the processor 120 or the image signal processor 260) may provide the function of sharing the video data 900 and the function of storing the video data 900 through at least some of the representative images 703. The video data 900 shared and stored may include the first video data 901 and the second video data 902 which is described below in detail.

In operation 2401, according to an embodiment, upon detecting a touch on at least some of the representative images 703, which lasts for a preset time or more, the electronic device 101 (e.g., the processor 120 or the image signal processor 260) may display, on the touchscreen, at least one of an object 2501 for sharing and an object for storing the first video data 901 corresponding to at least some of the representative images 703 as shown in FIG. 25.

In operation 2402, according to an embodiment, the electronic device 101 (e.g., the processor 120 or the image signal processor 260) may receive a selection of at least one of the displayed objects.

In operation 2403, according to an embodiment, the electronic device 101 (e.g., the processor 120 or the image signal processor 260) may edit the video data 900 corresponding to the selected object, in response to the selection of the object. Specifically, the electronic device 101 (e.g., the processor 120 or the image signal processor 260) may obtain edited video data 900 including the second video data 902 of the second video section corresponding to the selected object, the first video data 901 of the first video section during a preset first time before the start time point of the second video data 902, and the first video data 901 of the first video section during a preset second time after the end time point of the second video data 902. For example, obtaining the edited video data 900 may be extracting the video data 900 or removing the rest of the video data 900 from a time point that is the first time before the start time of the second video section, to a time point that is the second time after the end time point of the second video section. The preset first time and the preset second time may be equal to or different from each other. For example, the first time and the second time may be set to 1 second. For example, the first time may be set to 1 second, and the second time may be set to zero seconds.

As set forth above, the edited video data 900 may include the first video data 901 before and after the second video data 902, as well as the second video data 902 and may thus be naturally displayed. Specifically, as the playing speed of the edited video data 900 is dynamically varied, the playing screen 701 of the edited video data 900 may be naturally varied.

In operation 2404, according to an embodiment, the electronic device 101 (e.g., the processor 120 or the image signal processor 260) may store or share the obtained edited video data 900 in response to the selected object. The edited video data 900 may be stored in the memory of the electronic device. The edited video data 900 may be transmitted to another electronic device 101 (e.g., a server 108) connected with the electronic device via communication and may thus be shared.

As set forth above, the operation of storing or sharing the second video data 902 through at least some of the representative images 703 may be performed by the electronic device, so the second video data 902 may be used more easily.

Without being limited in order, operations 2401 to 2404 may be performed in a different order. Without being limited thereto, more or fewer operations than operations 2401 to 2404 may be performed.

A user's designation of a slow portion for a slow motion video is described below.

Figure 26:
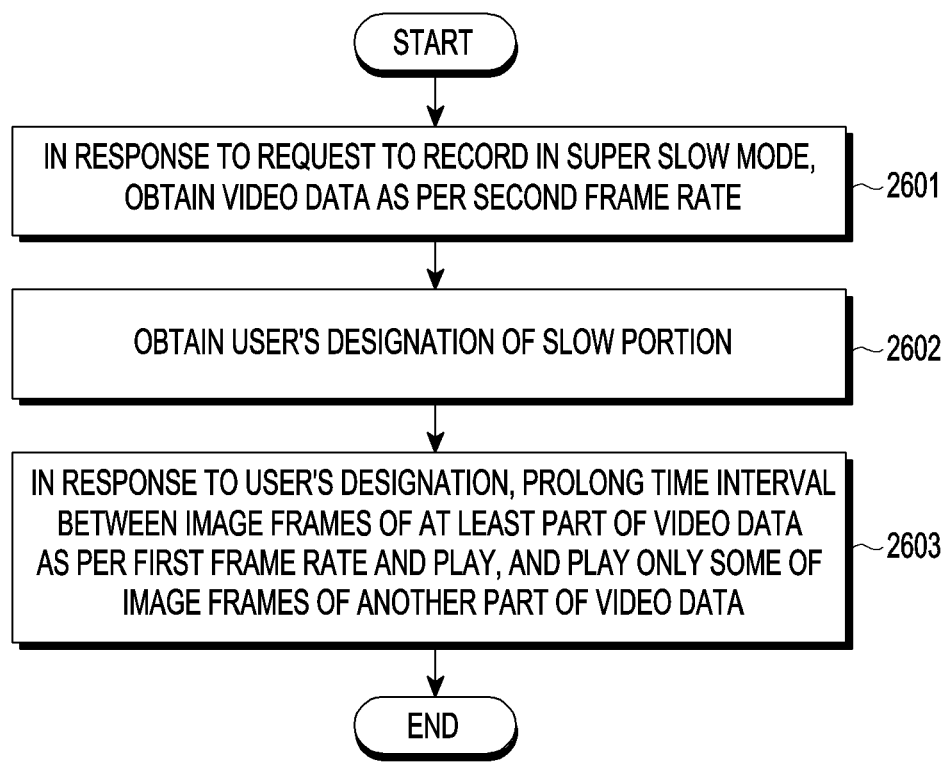
FIG. 26 is a flowchart illustrating a user's designation of a slow portion for a slow motion video according to an embodiment of the disclosure.

FIG. 26 is a flowchart illustrating a user's designation of a slow portion for a slow motion video according to an embodiment of the disclosure.

Figure 27:
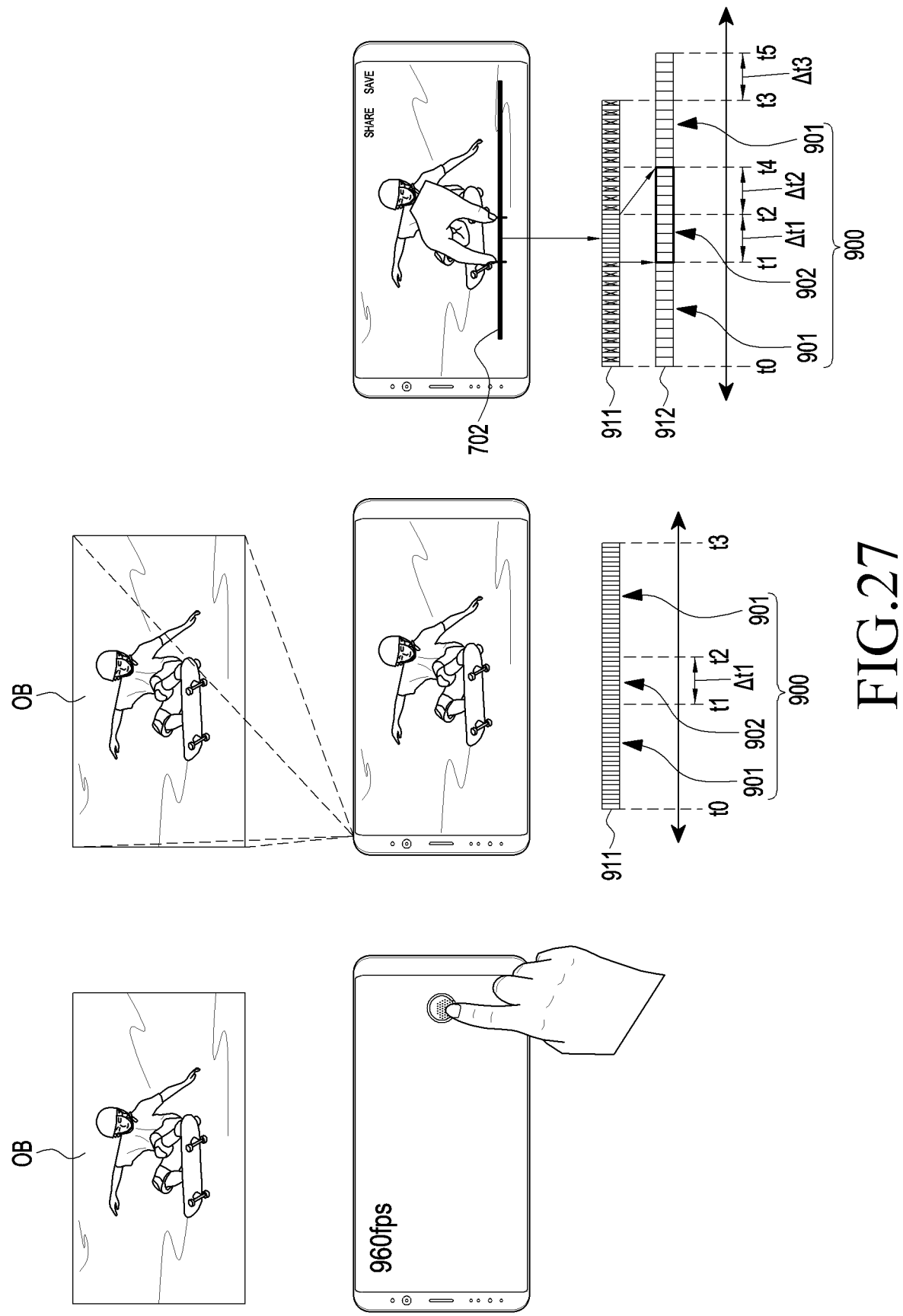
FIG. 27 is a view illustrating an example of recording and playing a slow motion video according to an embodiment of the disclosure.

FIG. 27 is a view illustrating an example of recording and playing a slow motion video according to an embodiment of the disclosure.

Figure 28:
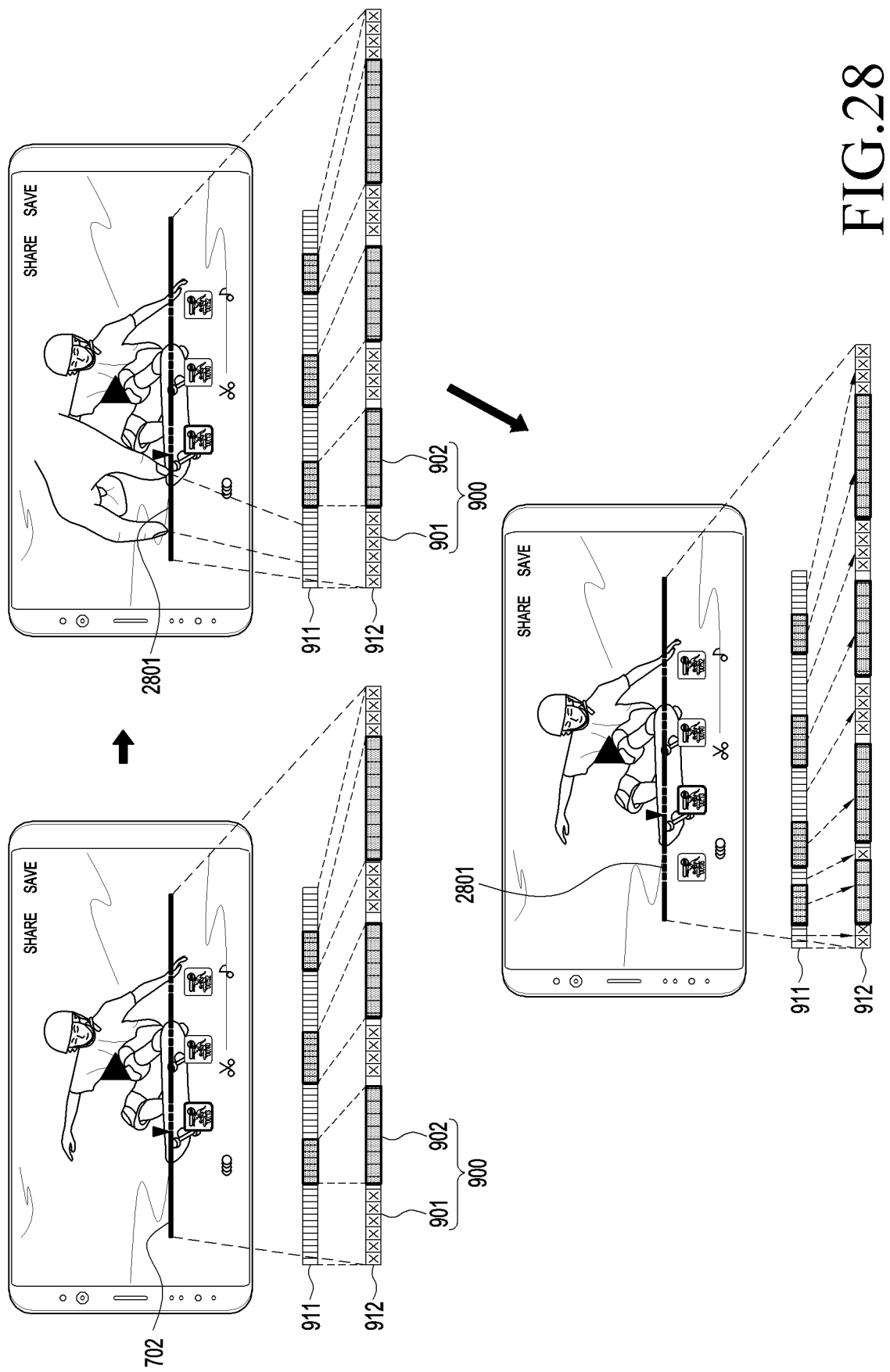
FIG. 28 is a view illustrating a user's designation of a slow portion for a slow motion video according to an embodiment of the disclosure.

FIG. 28 is a view illustrating a user's designation of a slow portion for a slow motion video according to an embodiment of the disclosure.

Referring to FIGS. 26, 27, and 28, according to an embodiment, the electronic device 101 (e.g., the processor 120 or the image signal processor 260) may set a portion when video data is played at slow speed by the user's designation.

Setting a portion when video data is played at slow speed based on the user's designation is described below in connection with FIGS. 26, 27, and 28. No repetitive description is made in relation to recording and playing the video data 900.

In operation 2601, the electronic device 101 may obtain video data at the second frame rate in response to a request for recording in super slow mode. As shown in FIG. 27, the electronic device 101 may obtain video data at, e.g., 960 fps.

In operation 2602, the electronic device 101 may detect the user's designation of a slow portion. For example, as shown in FIG. 27, the electronic device 101 may detect the user's touch on the progress bar 702 displayed on the touchscreen to set a slow portion, which is a playing portion for video data desired to be played at slow playing speed. In other words, the electronic device 101 may detect a touch on the video section set as the slow portion on the progress bar 702 as the user's designation for setting the slow portion.

In operation 2603, in response to the user's designation, the electronic device 101 (e.g., the processor 120 or the image signal processor 260) may prolong the time interval between the image frames constituting at least part of the video data at the first frame rate and play the video data and may play only at least some of the image frames of another part of the video data. Accordingly, the playing speed of the video data played with the inter-image frame interval made longer at the first frame rate may be slower than the playing speed of the video data only at least some of the image frames of which are played. For example, referring to FIG.

27, when the video section between the second time point and the third time point is set as the slow portion by the user's designation, the electronic device 101 may prolong the time interval between the image frames of the video data corresponding to the video section set as the slow portion at the first frame rate and play the video data and may play only at least some of the image frames of the video data corresponding to the video section not set as the slow portion. Meanwhile, when only some image frames of the video data are played, the number of image frames played may be determined based on the ratio of the first frame rate to the second frame rate and may specifically be determined as "(first frame rate/second frame rate)*total number of image frames."

The electronic device 101 (e.g., the processor 120 or the image signal processor 260) may display the video section set as the slow portion in a second form, visually splitting the video section set as the slow portion from the other video section. The electronic device 101 (e.g., the processor 120 or the image signal processor 260) may display, on the touchscreen, the representative image 703 corresponding to the video data corresponding to the video section set as the slow portion.

Without being limited in order, operations 2601 to 2603 may be performed in a different order. Without being limited thereto, more or fewer operations than operations 2601 to 2603 may be performed.

The user's designation of a slow portion of slow motion video is described below according to another embodiment.

Referring to FIG. 28, according to an embodiment, the electronic device 101 (e.g., the processor 120 or the image signal processor 260) may determine a slow portion at the user's designation on video data including at least one or more pieces of first video data and at least one or more pieces of second video data. Specifically, the electronic device 101 (e.g., the processor 120 or the image signal processor 260) may obtain the user's designation of the slow portion 2801 on the progress bar 702. Referring to FIG. 28, the user's designation may mean the user's touch on at least part of the first video section of the progress bar 702. In other words, the electronic device 101 (e.g., the processor 120 or the image signal processor 260) may obtain the user's selection on at least part of the first video section for the user's designation of the second video section. The electronic device 101 (e.g., the processor 120 or the image signal processor 260) may set at least part of the first video section in a shape corresponding to the shape of the second video section, corresponding to the user's designation. The electronic device 101 (e.g., the processor 120 or the image signal processor 260) may prolong, based on the playing target frame rate 912, the time interval between the image frames constituting the first video data 901 corresponding to at least part of the first video section selected and play the video data 900. The electronic device 101 (e.g., the processor 120 or the image signal processor 260) may display, on the touchscreen, at least some of the representative images 703 corresponding to the first video data 901 corresponding to at least part of the first video section designated. In other words, the electronic device 101 (e.g., the processor 120 or the image signal processor 260) may display at least one of the image frames constituting the first video data 901 corresponding to at least part of the first video section designated in the form of a thumbnail. As a result, the slow portion of video data 900 may be set by the user's designation, and the slow portion set by the user's designation may be visually recognized by the user in the form of a thumbnail.

By the above-described operation, the edited video data 900 may be stored or shared by an icon that provides the storing or sharing function as described above.

Described below is adjusting the speed for the slow portion of slow motion video according to an embodiment.

Figure 29:
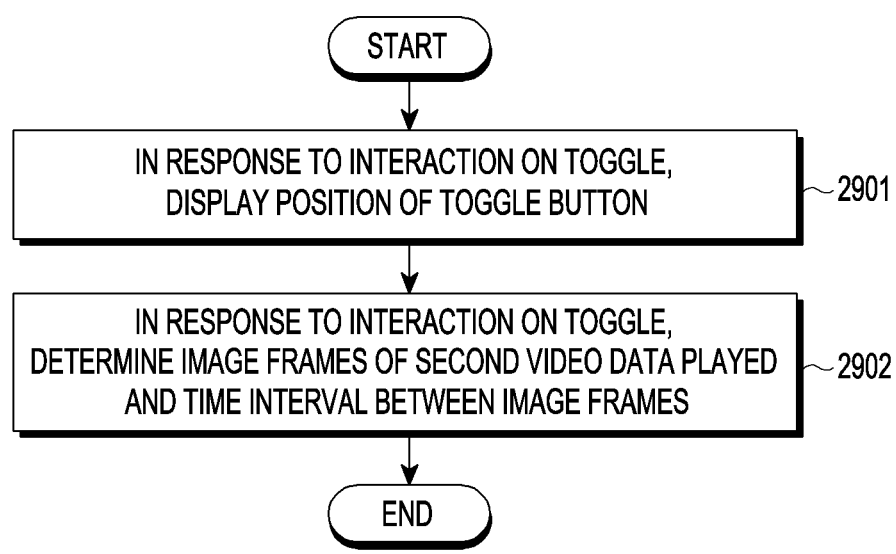
FIG. 29 is a flowchart illustrating an example of adjusting a speed in a slow portion for a slow motion video according to an embodiment of the disclosure.

FIG. 29 is a flowchart illustrating an example of adjusting a speed in a slow portion for a slow motion video according to an embodiment of the disclosure.

Figure 30:
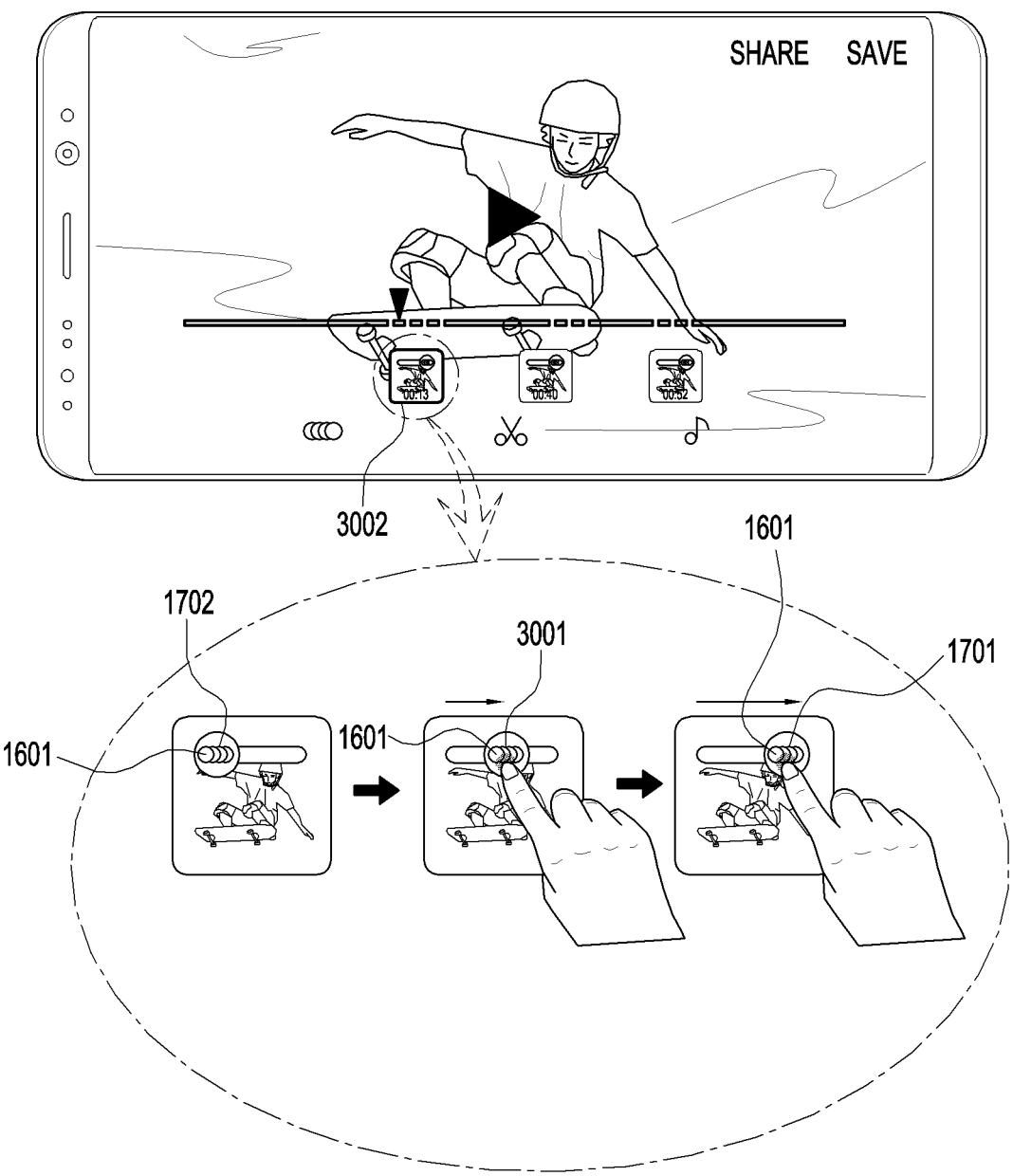
FIG. 30 is a view illustrating the position of a toggle button for adjusting a speed in a slow portion for a slow motion video according to an embodiment of the disclosure.

FIG. 30 is a view illustrating the position of an adjusting button of an adjusting key to adjust a speed of a slow portion of slow motion video according to an embodiment of the disclosure.

Figure 31:
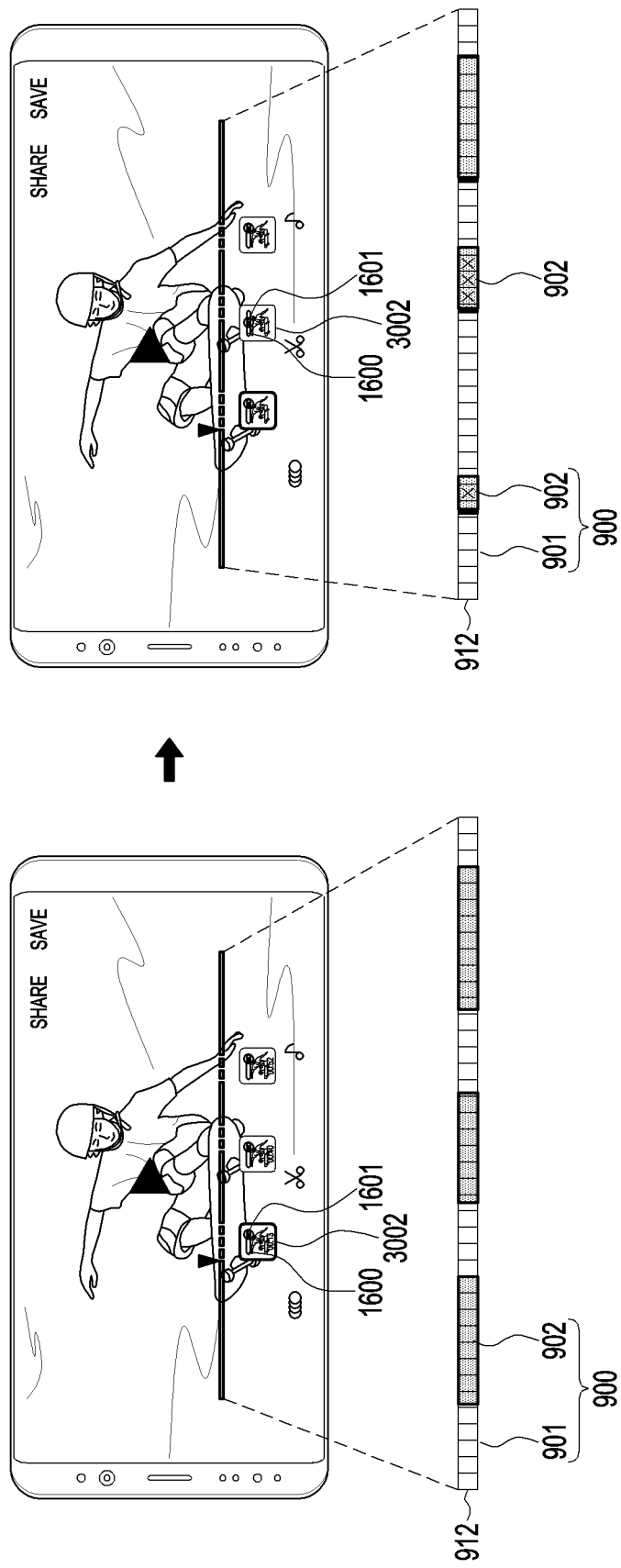
FIG. 31 is a view illustrating an image frame of video data for speed adjustment in a slow portion for a slow motion video according to an embodiment of the disclosure.

FIG. 31 is a view illustrating an image frame of video data for speed adjustment in a slow portion for a slow motion video according to an embodiment of the disclosure.

Referring to FIGS. 29, 30, and 31, according to an embodiment, the electronic device 101 (e.g., the processor 120 or the image signal processor 260) may determine the speed of playing the image frames of the second video data 902 of the video data 900 corresponding to the shape of the adjusting key 3002.

In operation 2901, according to an embodiment, the electronic device 101 (e.g., the processor 120 or the image signal processor 260) may display the position of the toggle button 1601 by an input on the adjusting key 3002. As shown in FIG. 30, the adjusting button may be located in a first position 1701, a second position 1702, and in a position 3001 between the first position and the second position under the user's control. The position 3001 between the first position and the second position may be determined to be one of various positions. For example, the position 3001 between the first position and the second position may be an n/m position among positions between the first position 1701 and the second position 1702 (when n and m are positive integers).

In operation 2902, according to an embodiment, the electronic device 101 (e.g., the processor 120 or the image signal processor 260) may determine the image frames of the second video data 902 played and the time interval between the image frames by an input on the adjusting key 3002. As set forth above, referring to FIG. 30, when the adjusting button is determined to be in the first position 1701 or the second position 1702, the electronic device 101 (e.g., the processor 120 or the image signal processor 260) may determine the time interval between the image frames of the second video data 902 of the video data 900 at the playing target frame rate 912 and play the second video data 902 or may play only some of the image frames of the second video data 902 at the playing target frame rate 912 of the first video data 901.

Referring to FIG. 30, when the adjusting button is determined to be in a position between the first position 1701 and the second position 1702, the electronic device 101 (e.g., the processor 120 or the image signal processor 260) may play the second video data 902 at the playing speed of the second video data 902 corresponding to the position of the adjusting button 3303. When the first position 1701 is determined as the slow motion playing mode, and the second position 1702 is determined as the normal playing mode, the playing speed may be determined as the normal playing speed if the adjusting button is in the second position 1702 and, as m/n times the slow motion speed if the adjusting button is determined as an n/m position among points between the first position 1701 and the second position 1702. As a specific example, when the adjusting button is in the ½ position, the playing speed may be determined as two times the normal playing speed, and when the slow motion playing speed is 1/12 times the normal mode speed, the playing speed may be determined as 1/6 times the normal mode speed.

Specifically, the electronic device 101 (e.g., the processor 120 or the image signal processor 260) may determine the time interval between the image frames of the second video data 902 at the playing target frame rate 912 corresponding to the position of the adjusting button while simultaneously playing some of the image frames of the second video data 902. In other words, when the adjusting button is determined to be in a position between the first position 1701 and the second position 1702, the electronic device 101 (e.g., the processor 120 or the image signal processor 260) may prolong the time interval between the image frames of the second video data 902 at the playing speed of the second video data 902 corresponding to the position of the adjusting button and play the second video data while simultaneously playing some of the image frames constituting the second video data 902.

According to an embodiment, the above-described operations may be performed in combination.

According to an embodiment, the method of operating the electronic device 101 may enable the processor 120 of the electronic device 101 to control each component of the electronic device 101 to perform the operations of the electronic device 101 based on the operations set on the processor 120 or may enable the processor 120 to control each component of the electronic device 101 to perform the operations of the electronic device 101 by instructions stored in the memory 130 of the electronic device 101.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

According to an embodiment, an electronic device comprises a touchscreen, at least one memory configured to store video data including at least one or more pieces of first video data obtained at a first frame rate and at least one or more pieces of second video data obtained at a second frame rate higher than the first frame rate, and at least one processor configured to, upon receiving a request to provide a playing screen of the video data, display the playing screen of the video data on a region of the touchscreen, upon receiving a request to provide an edit interface while displaying the playing screen of the video data, display, on the touchscreen, a progress bar to indicate a full video section including a first video section corresponding to the at least one or more pieces of first video data and a second video section corresponding to the second video data, and display, on the touchscreen, at least some of at least one representative image corresponding to each of the at least one or more pieces of second video data.

According to an embodiment, the processor may be configured to display thumbnails for at least some of the images included in each piece of second video data as at least part of displaying at least some of the representative images.

According to an embodiment, as at least part of displaying, on the touchscreen, the progress bar to indicate the full video section of the video data, the processor may be configured to further display an indicator to indicate a playing time point of the playing screen of the video data on the progress bar, and when the playing time point of the playing screen of the video data is included in a first video section, place the indicator on a portion of the progress bar corresponding to the first video section and highlight the thumbnail corresponding to the first video section.

According to an embodiment, as at least part of placing the indicator on the second video section, the processor may be configured to, upon detecting a touch on at least some of the representative images, place the indicator on a second video section corresponding to the thumbnail and display a playing screen of the second video data of the second video section corresponding to the thumbnail.

According to an embodiment, as at least part of displaying the at least some of the representative images, the processor may be configured to display a toggle to set a playing mode of the second video data on at least some of the representative images as any one of a normal playing mode or a slow motion playing mode.

According to an embodiment, as at least part of displaying the first object, the processor may be configured to display only some of a plurality of image frames constituting the second video data when the playing mode of the second video data is the normal playing mode and prolong a time interval between the plurality of image frames constituting the second video data and display all of the image frames constituting the second video data when the playing mode of the second video data is the slow motion playing mode.

According to an embodiment, the processor may be configured to set the playing mode of the second video data as the normal playing mode when the toggle button is moved from a first position to a second position and, as the slow motion playing mode when the toggle button is moved from the second position to the first position, by an input on the toggle of at least some of the representative images.

According to an embodiment, as at least part of displaying the first object, the processor may be configured to, when the toggle is first displayed, display the toggle button of the toggle in the first position which is a preset position corresponding to the normal playing mode of at least some of the representative images displayed on the touchscreen.

According to an embodiment, the processor may be configured to display the second video section of the progress bar in a second form upon detecting the input on the toggle of the at least some of the representative images.

According to an embodiment, the processor may be configured to, upon detecting a request to trim the video data, display trimmed images corresponding to image frames included in the video data instead of the at least some of the at least one representative image corresponding to the at least one or more pieces of second video data and a trim bar, identify a trimmed video section corresponding to a position of the trim bar corresponding to a command to adjust the trim bar displayed on the plurality of images, and change a color value of at least some of the representative images corresponding to the second video data included in the video data-trimmed portion.

According to an embodiment, the processor may be configured to, when the position of the trim bar corresponds to any one of the at least one or more pieces of the video data, display images included in the corresponding second video data instead of the plurality of images.

According to an embodiment, the processor may be configured to, upon detecting a touch lasting for a preset time or more on at least some of the representative images, display a key for sharing and a key for storing the second video data corresponding to at least some of the representative images.

According to an embodiment, the processor may be configured to, upon detecting a touch on a key for storing the second video data, store the second video data corresponding to at least some of the representative images, first video data a preset time before a start time point of the second video section of the second video data, and first video data within a preset time after an end time point of the second video section of the second video data.

According to an embodiment, a method for operating an electronic device comprises storing video data including at least one or more pieces of first video data obtained at a first frame rate and at least one or more pieces of second video data obtained at a second frame rate higher than the first frame rate, upon receiving a request to provide a playing screen of the video data, displaying the playing screen of the video data on a region of a touchscreen, upon receiving a request to provide a progress bar while displaying the playing screen of the video data, displaying, on the touchscreen, a progress bar to indicate a full video section including a first video section corresponding to the at least one or more pieces of first video data and a second video section corresponding to the second video data, and displaying, on the touchscreen, at least some of at least one representative image corresponding to each of the at least one or more pieces of second video data.

According to an embodiment, the method may further comprise displaying thumbnails for at least some of the images included in each piece of second video data as at least part of displaying at least some of the representative images.

According to an embodiment, as at least part of displaying, on the touchscreen, the progress bar to indicate the full video section of the video data, the method may further comprise further displaying an indicator to indicate a playing time point of the playing screen of the video data on the progress bar, and when the playing time point of the playing screen of the video data is included in a first video section, placing the indicator on a portion of the progress bar corresponding to the first video section and highlighting the thumbnail of the representative image corresponding to the first video section.

According to an embodiment, as at least part of placing the indicator on the second video section, the method may further comprise, upon detecting a touch on at least some of the representative images, placing the indicator on a second video section corresponding to the thumbnail and displaying a playing screen of the second video data of the second video section corresponding to the thumbnail.

According to an embodiment, as at least part of displaying the at least some of the representative images, the method may further comprise displaying a toggle to set a playing mode of the second video data on at least some of the representative images as any one of a normal playing mode or a slow motion playing mode.

According to an embodiment, as at least part of displaying the first object, the method may further comprise displaying only some of a plurality of image frames constituting the second video data when the playing mode of the second video data is the normal playing mode and prolonging a time interval between the plurality of image frames constituting the second video data and displaying all of the image frames constituting the second video data when the playing mode of the second video data is the slow motion playing mode.

According to an embodiment, the method may further comprise setting the playing mode of the second video data as the normal playing mode when the toggle button is moved from a first position to a second position and, as the slow motion playing mode when the toggle button is moved from the second position to the first position, by an input on the toggle of at least some of the representative images.

As is apparent from the foregoing description, according to various embodiments, there may be provided an electronic device, and a method for operating the electronic device, for displaying a video data control interface to allow the user to edit slow motion video in an easier and more convenient manner. For example, when the electronic device plays a slow motion video, the electronic device may set the playing speed of at least part of a slow motion video recorded to be lower than the playing speed of another part thereof. When the user desires to edit at least part of the slow motion video played at the lower playing speed, the electronic device and method for operating the same to provide a video data control interface allows the user to do so. This eliminates the need for burdensome control of the electronic device to edit at least part of the slow motion video, leading to easier and more convenient editing of slow motion video as set forth above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   camera circuitry;
   a touchscreen;
   at least one memory; and
   at least one processor configured to:
      receive a request for recording in slow mode,
      obtain video data for a video consisting of sequentially captured image frames at a first frame rate based on the request, wherein the video data includes at least one first video data and at least one second video data,
      receive an input of a user for editing the video data,
      based on the input of the user, control the touchscreen to display a playing screen for the video data, a bar to indicate a full video section of the video data on a first portion of the touchscreen, a plurality of images corresponding to a plurality of image frames included in the video data on a second portion of the touchscreen, and at least one object configured to provide an edit function to change a color value of the video data and the plurality of images corresponding to the plurality of the image frame, and
      adjust a playback speed of the at least one second video data to a second frame rate based on a designation of the user, wherein the second frame rate is lower than the first frame rate,
   wherein the bar includes at least one first video section corresponding to the at least one first video data of which a playback speed is the first frame rate, and at least one second video section corresponding to the at least one second video data of which the play back speed is the second frame rate, and
   wherein a shape of the at least one first video section and a shape of the at least one second video section are different from each other.

2. The electronic device of claim 1,
   wherein the at least one processor is further configured to:
      control the touchscreen to display a first object and a second object on the plurality of images, and
      based on an input of a user for changing a distance between the first object and the second object, obtain a piece of the video data corresponding to the changed distance, and
   wherein the piece of the video data includes a piece of the at least one second video data.

3. The electronic device of claim 1, wherein the at least one processor is further configured to:
      based on an input of the user for selecting a position on the plurality of images, control the touchscreen to display the playing screen for the video data related to a time point corresponding to the selected position.

4. The electronic device of claim 1, wherein the at least one processor is further configured to:
      control the touchscreen to display the at least one of the plurality of images regardless of a playing time point of the video data.

5. The electronic device of claim 1,
   wherein at least one of the plurality of images includes a graphical object configured to set the playback speed for the at least one second video data to the second frame rate.

6. The electronic device of claim 1, wherein adjusting the playback speed of the at least one second video data to the second frame rate comprises changing a time interval between displaying of image frames in the at least one second video data.

7. The electronic device of claim 1, wherein adjusting the playback speed of the at least one second video data to the second frame rate comprises displaying only a subset of image frames in the at least one second video data.

8. A method of operating an electronic device, comprising:
   receiving a request for recording in slow mode;
   obtaining video data for a video consisting of sequentially captured image frames at a first frame rate based on the request, wherein the video data includes at least one first video data and at least one second video data;
   receiving an input of a user for editing the video data;
   based on the input of the user displaying a playing screen for the video data, a bar to indicate a full video section of the video data on a first portion of a touchscreen, a plurality of images corresponding to a plurality of image frames included in the video data on a second portion of the touchscreen, and at least one object configured to provide an edit function to change a color value of the video data and the plurality of images corresponding to the plurality of the image frame; and
   adjusting a playback speed of the at least one second video data to a second frame rate based on a designation of the user, wherein the second frame rate is lower than the first frame rate,
   wherein the bar includes at least one first video section corresponding to the at least one first video data of which a playback speed is the first frame rate and at least one second video section corresponding to the at least one second video data of which the play back speed is the second frame rate, and wherein a shape of the at least one first video section and a shape of the at least one second video section are different from each other.

9. The method of claim 8, further comprising:

displaying a first object and a second object on the plurality of images; and based on an input of a user for changing a distance between the first object and the second object, obtaining a piece of the video data corresponding to the changed distance, wherein the piece of the video data includes a piece of the at least one second video data.

10. The method of claim 8, further comprising:

based on an input of the user for selecting a position on the plurality of images, displaying the playing screen for the video data related to a time point corresponding to the selected position.

11. The method of claim 8, further comprising:

displaying the at least one of the plurality of images regardless of a playing time point of the video data.

12. The method of claim 8, wherein at least one of the plurality of images includes a graphical object configured to set the playback speed for the at least one second video data to the second frame rate.

* * * * *